US012788010B2

(12) United States Patent
Feist et al.

(10) Patent No.: US 12,788,010 B2

(45) Date of Patent: Nov. 10, 2026

(54) USE OF SAFENERS TO IMPROVE RESISTANCE OF RICE CROP TO HERBICIDES

(71) Applicants: David Feist, Fort Collins, CO (US); Dale Shaner, Fort Collins, CO (US); Andy Kendig, Chesterfield, MO (US)

(72) Inventors: David Feist, Fort Collins, CO (US); Dale Shaner, Fort Collins, CO (US); Andy Kendig, Chesterfield, MO (US)

(73) Assignee: ADAMA AGAN LTD., Ashdod (IL)

( * ) Notice: Subject to any disclaimer, the term of this patent is extended or adjusted under 35 U.S.C. 154(b) by 648 days.

(21) Appl. No.: 16/982,981

(22) PCT Filed: Mar. 20, 2019

(86) PCT No.: PCT/US2019/023103

§ 371 (c)(1),
(2) Date: Sep. 21, 2020

(87) PCT Pub. No.: WO2019/183180

PCT Pub. Date: Sep. 26, 2019

(65) Prior Publication Data

US 2021/0022342 A1 Jan. 28, 2021

Related U.S. Application Data

(60) Provisional application No. 62/646,075, filed on Mar. 21, 2018.

(51) Int. Cl.

| | |
|---|---|
| ***A01N 43/50*** | (2006.01) |
| ***A01N 25/32*** | (2006.01) |
| ***A01N 43/60*** | (2006.01) |
| ***A01N 43/80*** | (2006.01) |

(52) U.S. Cl.

CPC ............. *A01N 43/50* (2013.01); *A01N 25/32* (2013.01); *A01N 43/60* (2013.01); *A01N 43/80* (2013.01)

(58) Field of Classification Search

CPC combination set(s) only.
See application file for complete search history.

(56) References Cited

U.S. PATENT DOCUMENTS

| | | | | |
|---|---|---|---|---|
| 6,656,883 | B1 | 12/2003 | Vogt et al. | |
| 9,370,149 | B2 * | 6/2016 | Hinga | C12Y 604/01002 |
| 2004/0235665 | A1 * | 11/2004 | Zagar | A01N 43/54 504/243 |
| 2011/0237437 | A1 | 9/2011 | Cheung et al. | |
| 2011/0287934 | A1 | 11/2011 | Hacker et al. | |

FOREIGN PATENT DOCUMENTS

| | | | | |
|---|---|---|---|---|
| CA | 2879653 | A1 * | 1/2014 | A01N 25/32 |
| EP | 0375875 | A2 * | 7/1990 | C12N 15/52 |
| WO | WO 2010/046422 | A2 | 4/2010 | |

OTHER PUBLICATIONS

Abu-Qare, A. W. et al. Chemosphere, 48, 2002, 965-974 (Year: 2002).*

Weed Mgmt pamphlet (https://web.archive.org/web/20100620133808/https://ipm.ifas.ufl.edu/resources/success_stories/t&pguide/pdfs/Chapter6/Weed_Mgmt.pdf), p. 1-7 (Year: 2010).*

CHEBI definition herbicide safener, No pagination, no clear date available, accessed May 2, 2024 (https://www.ebi.ac.uk/chebi/searchId.do;jsessionid=CD2C32DB3F063F75153CDBF2BF2DBE93?chebiId=CHEBI:132272).*

International Search Report issued Jun. 6, 2019 in connection with PCT International Application No. PCT/US2019/023103.

Written Opinion (form PCT/ISA/237) issued Jun. 6, 2019 in connection with PCT International Application No. PCT/US2019/023103.

* cited by examiner

*Primary Examiner* — Erin E Hirt

(74) *Attorney, Agent, or Firm* — Gary J. Gershik

(57) ABSTRACT

The subject invention provides a herbicidal mixture for controlling undesired vegetation in the vicinity of an herbicide resistant rice crop, wherein the herbicidal mixture comprises a) an acetyl Co-A carboxylase (ACCase) inhibiting herbicide or a 4-hydroxyphenylpyruvate dioxygenase (HPPD) inhibiting herbicide or an acetolactate (acetohydroxy acid) synthase ALS (MIAS) inhibiting herbicides or combinations thereof and b) an herbicide safener selected from isoxadifen, cloquintocet, AD-67, benoxacor and fenclorim, and esters, salts and combinations thereof. The present invention also provides compositions comprising the herbicidal mixtures disclosed herein and methods of controlling undesired vegetation in the vicinity of a rice crop using the herbicidal mixtures and compositions disclosed herein.

18 Claims, 5 Drawing Sheets

A.

B.

C.

A.

B.

C.

USE OF SAFENERS TO IMPROVE RESISTANCE OF RICE CROP TO HERBICIDES

CROSS-REFERENCE TO RELATED APPLICATIONS

This application is a § 371 national stage of PCT International Application No. PCT/US2019/023103, filed Mar. 20, 2019, claiming priority of U.S. Provisional Application No. 62/646,075, filed Mar. 21, 2018, the entire contents of each of which are hereby incorporated by reference hereininto the application.

Throughout this application various publications are referenced. The disclosures of these documents in their entireties are hereby incorporated by reference into this application in order to more fully describe the state of the art to which this invention pertains.

TECHNICAL FIELD

The present invention provides mixtures, compositions and methods for controlling undesired vegetation in the vicinity of an herbicide resistant rice crop. In particular, the present invention provides an herbicidal mixture comprising (i) are acetyl-CoA carboxylase (ACCase) inhibiting herbicide or a 4-hydroxyphenylpynivate dioxygenase (HPPD) inhibiting herbicide or an acetolactate (acetohydroxy acid) synthase (ALS or AHAS) inhibiting herbicide, or any combination thereof; and (ii) at least one safener selected from isoxadifen, cloquintocet, AD-67, benoxacor and fenclorim, and esters, salts and combinations thereof. The herbicide resistant rice crops are resistant cultivars and hybrids resistant to ACCase-, ALS- and HPPD-inhibiting herbicides and any combination thereof.

BACKGROUND

Controlling undesired vegetation is extremely important in achieving high crop efficiency. In many cases, however, herbicides that are effective in eradicating a spectrum of weeds are also damaging to the crop. To protect the crop from the negative effects of herbicides and to increase the resistance of the crop to the herbicides, safeners are often used.

Safeners usually work by inducing expression of genes that code for enzymes involved in herbicide detoxification which leads to more rapid degradation of herbicides so that a damaging concentration is not reached. Various chemicals are known as safeners for different herbicides and crops. Examples of safeners are isoxadifen, cloquintocet, AD-67, benoxacor and fenclorim, and ester thereof. However, safeners may also reduce the sensitivity of the weeds to the herbicides. It is difficult to predict behavior of weeds in the presence of safeners.

Furthermore, the outcome of combining two mechanisms to elicit a desired outcome, i.e. reduced phytotoxicity of herbicides, increased resistance to herbicides and/or decreased herbicide effect, is unpredictable even if each mechanism is known to elicit the desired outcome independently. In vivo interactions between biological mechanisms are complex. When a safener is applied to an herbicide resistant rice crop, it is unpredictable whether the biological pathways induced by the safener will complement, have no effect on, or interfere with, the biological pathways involved in conferring herbicide resistance to the rice crop. Not only may the interaction between these two mechanisms affect the intended outcome, the interaction may also increase toxicity. The state of the art at the time of filing is that the effect of applying safeners selected from isoxadifen, cloquintocet, AD-67, benoxacor and fenclorim, and esters, salts and combinations thereof, to herbicide resistant rice crop cannot be predicted until the results of formal studies are available.

Aryloxyphenoxypropionate (FOPs) is a class of herbicides that act by inhibiting acetyl CoA carboxylase (ACCase) which leads to the inhibition of fatty acid biosynthesis. Examples of FOPs, i.e. ACCase inhibiting herbicides, include dodinafop-propargyl, cyhalofop-butyl, diclofop-methyl, fluazifop-butyl, haloxyfop, propaquizafop ((R)-2-[[(1-methylethylidene)amino]oxy]ethyl 2-[4-[(6-chloro-2-quinoxalinyl)oxy]phenoxy]propanoate, first reported by P. F. Bocion et al. (Proc. 1987 Br. Crop Prot. Conf.-Weeds, 1, 55)), and quizalofop ((2-isopropylideneamino-oxyethyl (R)-2-[4-(6-chloroquinoxalin-2-yloxy) phenoxy] propionate, first reported by G. Sakata et al. (Proc. $10^{th}$ Int. Congr. Plant Prot. 1983, 1, 315)).

Imidazolinone is a class of herbicides that act by inhibiting acetolactate synthase (ALS), also known as acetohydroxyacid synthase (AHAS), which leads to the inhibition of branched chain amino acid synthesis biosynthesis. Specifically, they inhibit the catalytic action of ALS (AHAS). Examples of imidazolines, i.e. ALS (AHAS) inhibiting herbicides, include imazethapyr (2-[4,5-dihydro-4-methyl-4-(1-methylethyl)-5-oxo-1H-imidazol-2-yl]-5-ethyl-3-pyridinecarboxylic acid, first reported by T. Malefyt et al. (Abstr. 1984 Weed Sci. Soc. Mtg., Miami, p. 18, Abstract 49)), imazamox (2-[(RS)-4-isopropyl-4-methyl-5-oxo-2-imidazolin-2-yl]-5-methoxymethylnicotinic acid), imazpic (5-methyl-2-[4-methyl-5-oxo-4-(propan-2-yl)-4,5-dihydro-1H-imidazol-2-yl]pyridine-3-carboxylic acid), and imazapyr ((RS)-2-(4-Methyl-5-oxo-4-propan-2-yl-1H-imidazol-2-yl) pyridine-3-carboxylic acid was first reported by P. L. Orwick et al. (Proc. South. Weed Sci. Soc. Annu. Mtg., 36th, 1983, p. 291)).

Cyclohexane-1,3-dione is a class of herbicides that act by inhibiting HPPD (i.e. HPPD inhibiting herbicides) which leads to the inhibition of carotenoid biosynthesis. Examples of cyclohexane-1,3-diones, i.e. HPPD inhibiting herbicides, include mesotrione (2-[4-(Methylsulfonyl)-2-nitrobenzoyl] cyclohexane-1,3-dione), tembotrione (2-{2-chloro-4-(methylsullfonyl)-3-[(2,2,2-trifluoroethoxy)methyl]benzoyl}-1,3-cyclohexanedione or 2-{2-chloro-4-mesyl-3 -[(2,2,2-trifluoroethoxy)methyl]benzoyl}cyclohexane-1,3-dione), and toprarnezone ([3-(4,5-Dihydro-3-isoxazolyl)-2-methyl-4-(methylsulfonyl)phenyl](5-hydroxy-1-methyl-1H-pyrazol-4-yl)methanone).

Several wild, feral and weedy rice varieties exist as weeds in rice, including red rice. Weeds in rice compete with rice crop for nutrients, water and space. Weedy rice varieties are particularly difficult to control because they are genetically closely related to commercial rice and also because of their morphological variability, growth behavior, ability to cross pollinate and high biological affinity with crop varieties. Controlling weedy rice requires using herbicides which are also very toxic to the crop. In fact, all known herbicides that would kill weedy rice would also significantly damage the rice crop and herbicides that commercial rice tolerates are also tolerated by weed.

Current weedy rice control methods are expensive, time-consuming and usually do not lead to a total eradication of the weed infestation. Incomplete control is problematic because even a small amount of remaining weedy rice can produce enough seeds to restore original soil seed bank population levels.

There is a need for efficient and highly selective control of weedy rice without damaging desirable, commercial rice. Accordingly, there is a need to find an herbicidal mixture that effectively controls weedy rice without significantly damaging the rice crop.

SUMMARY

The present invention provides an herbicidal mixture for controlling undesired vegetation in the vicinity of an herbicide resistant rice crop, wherein the herbicidal mixture comprises a) an acetyl CoA carboxylase (ACCase) inhibiting herbicide or an acetolactate acetohydroxy acid) synthase (ALS or AHAS) inhibiting herbicide or a 4-hydroxyphenylpyruvate dioxygenase (HPPD) inhibiting herbicide or any combination thereof and b) at least one herbicide safener selected from isoxadifen, cloquintocet, AD-67, benoxacor and fenclorim, and esters, salts and combinations thereof.

The present invention also provides an herbicidal composition for controlling undesired vegetation in the vicinity of an herbicide resistant rice crop, wherein the herbicidal composition comprises any one of the herbicidal mixtures disclosed herein and at least one agriculturally acceptable carrier.

The present invention also provides an herbicidal composition for controlling undesired vegetation in the vicinity of an herbicide resistant rice crop, wherein the herbicidal composition comprises a) at least one ACCase inhibiting herbicide or ALS (AHAS) inhibiting herbicide or HPPD inhibiting herbicide or any combination thereof and b) at least one herbicide safener selected from isoxadifen, cloquintocet, AD-67, benoxacor and fenclorim, and esters, salts and combinations thereof.

The present invention provides an herbicidal composition comprising a) an ACCase inhibiting herbicide or an ALS (AHAS) inhibiting herbicide or a HPPD inhibiting herbicide or any combination thereof and b) at least one herbicide safener selected from isoxadifen, cloquintocet, AD-67, benoxacor and fenclorim, and esters, salts and combinations thereof.

The present invention also provides an herbicidal composition comprising (i) a mixture of propaquizafop and isoxadifen, and (ii) at least one agriculturally acceptable carrier.

The present invention also provides an herbicidal composition comprising (i) a mixture quizalofop and isoxadifen, and (ii) at least one agriculturally acceptable carrier.

The present invention also provides an herbicidal composition comprising (i) a mixture of imazethapyr and isoxadifen, and (ii) at least one agriculturally acceptable carrier.

The present invention also provides an herbicidal composition comprising (i) a mixture of imazamox and isoxadifen, and (ii) at least one agriculturally acceptable carrier.

The present invention also provides a kit comprising any one of the herbicidal mixtures or compositions disclosed herein, or components thereof.

The present invention also provides a method of controlling undesired vegetation in the vicinity of an herbicide resistant rice crop comprising applying any one of the herbicidal mixtures or compositions disclosed herein to a locus of the undesired vegetation so as to effectively control the undesired vegetation.

The present invention also provides a method of controlling undesired vegetation in the vicinity of an herbicide resistant rice crop comprising applying a) an effective amount of an ACCase inhibiting herbicide or an HPPD inhibiting herbicide or an ALS (AHAS) inhibiting herbicide or any combination thereof and b) an effective amount of at least one herbicide safener selected from isoxadifen, cloquintocet, AD-67, benoxacor and fenclorim and esters, salts and combinations thereof to a locus of the undesired vegetation so as to effectively control the undesired vegetation.

The present invention also provides a method of reducing phytotoxic action of an ACCase inhibiting herbicide and/or an HPPD inhibiting herbicide and/or an ALS (AHAS) inhibiting herbicide on an herbicide resistant rice crop, wherein the method comprises applying an effective amount of at least one safener selected from isoxadifen, cloquintocet, AD-67, benoxacor and fenclorim, and esters, salts and combinations thereof to the herbicide resistant rice crop so as to effectively reduce the phytotoxic action of the ACCase inhibiting herbicide and/or the HPPD inhibiting herbicide and/or the ALS (AHAS) inhibiting herbicide on the herbicide resistant rice crop compared to the phytotoxic action on the same rice crop to which the safener was not applied.

The present invention also provides a method of increasing resistance of an herbicide resistant rice crop to an ACCase inhibiting herbicide and/or an ALS (AHAS) inhibiting herbicide and/or a HPPD inhibiting herbicide comprising applying an effective amount of at least one safener selected from isoxadifen, cloquintocet, AD-67, benoxacor and fenclorim, and esters, salts and combinations thereof to the herbicide resistant rice crop with so as to thereby increase resistance of the herbicide resistant rice crop to the ACCase inhibiting herbicide and/or the ALS (AHAS) inhibiting herbicide and/or the HPPD inhibiting herbicide compared to the resistance of same rice crop to which the safener was not applied.

The present invention also provides a method for reducing herbicide effects of an ACCase inhibiting herbicides and/or an HPPD inhibiting herbicides and/or an ALS (AHAS) inhibiting herbicides in herbicide resistant rice crop, comprising applying at least one safener selected from isoxadifen, cloquintocet, AD-67, benoxacor and fenclorim, and esters, salts and combinations thereof to a plant and/or seed of the herbicide resistant rice crop so as to thereby reduce herbicide effects in the herbicide resistant rice crop compared to the herbicide effects in the same rice crop to which the safener was not applied.

The present invention also provides a method for increasing resistance to an ACCase inhibiting herbicide and/or an HPPD inhibiting herbicide and/or an ALS (AHAS) inhibiting herbicide in herbicide resistant rice crop wherein the herbicide resistant rice crop is treated with at least one safener selected from isoxadifen, cloquintocet, AD-67, benoxacor and fenclorim, and esters, salts and combinations thereof.

The present invention also provides an herbicide resistant rice crop with increased resistance to an ACCase inhibiting herbicide and/or an HPPD inhibiting herbicide and/or an ALS (AHAS) inhibiting herbicide wherein the rice crop is treated with at least one safener selected from isoxadifen, cloquintocet, AD-67, benoxacor and fenclorim, and esters, salts and combinations thereof.

The present invention also provides a synergistic combination comprising (i) at least one mutant for resistant to a) an ACCase inhibiting herbicide or an ALS (AHAS) inhibiting herbicide or a HPPD inhibiting herbicide or any combination thereof and (ii) at least one herbicide safener selected from isoxadifen, cloquintocet, AD-67, benoxacor and fenclorim, and esters, salts and combinations thereof.

The present invention also provides a synergistic combination comprising (i) at least one rice crop resistant to an ACCase inhibiting herbicide or an ALS (AHAS) inhibiting herbicide or a HPPD inhibiting herbicide or any combination thereof and (ii) at least one herbicide safener selected from isoxadifen, cloquintocet, AD-67, benoxacor and fenclorim, and esters, salts and combinations thereof.

The present invention also provide a method of controlling undesired vegetation in the vicinity of an herbicide resistant rice crop comprising (i) applying at least one safener selected from isoxadifen, cloquintocet, AD-67, benoxacor and fenclorim, and esters, salts and combinations thereof to a seed of the herbicide resistant rice crop and (ii) applying an effective amount of an ACCase inhibiting herbicide or an HPPD inhibiting herbicide or an ALS (AHLS) inhibiting herbicide or any combination thereof to a locus of the undesired vegetation so as to effectively control the undesired vegetation.

DETAILED DESCRIPTION

Definitions

Figure 1:
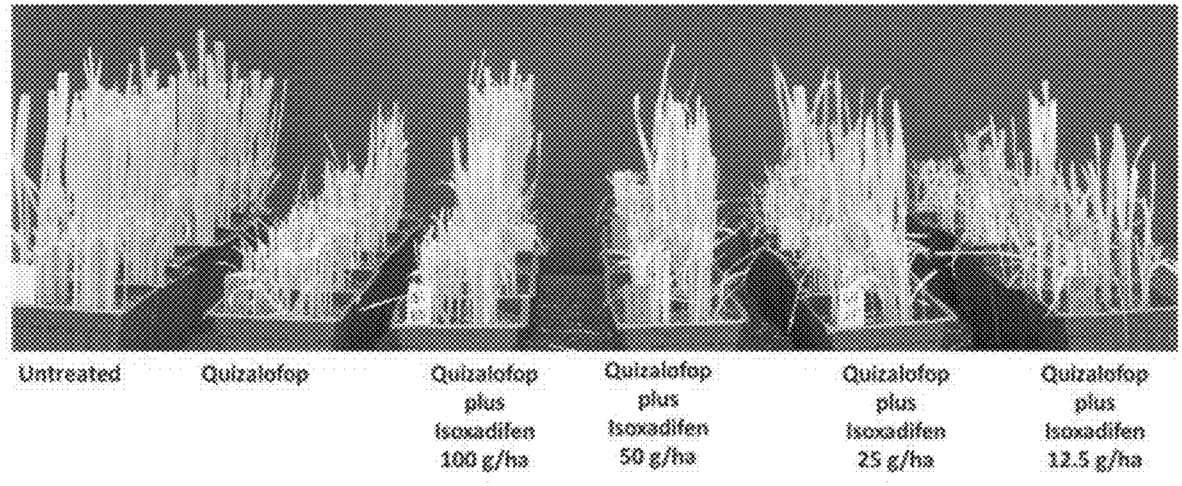
FIG. 1 shows the effect of isoxadifen on the regrowth of the mutant rice after application of quizalofop-ethyl.

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains.

As used herein, the phrase "agriculturally acceptable carrier" means carriers which are known and accepted in the art for the formation of formulations for agricultural or horticultural use.

As used herein, the term "crop" includes reference to a whole plant, plant organ (e.g., leaves, stems, twigs, roots, trunks, limbs, shoots, fruits etc.), plant cells, or plant seeds. This term encompasses plant crops such as fruits. The term also encompasses plant propagation materials, which may include seeds and spores, and vegetative structures such as bulbs, corms, tubers, rhizomes, roots stems, basal shoots, stolons, and buds.

As used herein, the term "herbicide resistant rice crop" refers to a mutant line of rice crop which is resistant to a specific herbicide. Herbicide resistant rice crop includes genetically modified and non-genetically modified rice crops. Non-genetically modified herbicide resistant rice crop may be obtained by techniques such as selection.

Herbicide resistant rice crop refers but is not limited to rice with resistance to HPPD inhibiting herbicides and/or ACCase inhibiting herbicides and/or ALS (AHAS) inhibiting herbicides. Herbicide resistant rice crops include but are not limited to ML0831266-03093 (ATCC deposit PTA-13620), ML0831265-01493 (ATCC deposit PTA-12933, mutation G2096S), PL121448M2-80048 (ATCC deposit PTA-121362) and PL 1214418M2-73009 (ATCC deposit PTA-121398) (as described, for example, in WO 2015/025031).

As used herein, the term "locus" includes not only areas where undesired vegetation may already be growing, but also areas where undesired vegetation has yet to emerge and areas under cultivation.

As used herein, the term "post-emergence," refers to the application of the herbicidal mixtures or compositions to the undesired vegetation that has emerged from the soil. The term "pre-emergence" refers to the application of the herbicidal mixtures or compositions to a habitat, an undesired vegetation, or soil, prior to the emergence of the undesired vegetation from the soil.

As used herein, the term "control of undesired vegetation" refers to the interference with the normal growth and development of the undesired vegetation. Examples of control activity include, but are not limited to, inhibition of root growth, inhibition of shoot growth, inhibition of shoot emergence, inhibition of seed production, or reduction of biomass of the undesired vegetation.

As used herein, the term "effective" when used to describe a method for controlling of undesired vegetation means that the method provides a good level of control of the undesired vegetation without significantly interfering with the normal growth and development of the crop.

As used herein, the term "effective amount" refers to an amount of the mixture that, when ingested, contacted with or sensed, is sufficient to achieve a good level of control.

As used herein, the term "surfactant" refers to any agriculturally acceptable material which imparts emulsifiability, stability, spreading, wetting, dispersibility, or other surface-modifying properties.

As used herein, the term "mixture" or "combination" refers, but is not limited to, a combination in any physical form, e.g., blend, solution, alloy, or the like.

As used herein, the term "a" or "an" as used herein includes the singular and the plural, unless specifically stated otherwise. Therefore, the terms "a," "an" or "at least one" can be used interchangeably in this application.

As used herein, the term "about" when used in connection with a numerical value includes ±10% from the indicated value. In addition, the endpoints of all ranges directed to the same component or property herein are inclusive of the endpoints, are independently combinable, and include all intermediate points and ranges. It is understood that where a parameter range is provided, all integers within that range, and tenths thereof, are also provided by the invention. For example, "0.1-99 wt. %" includes 0.1 wt. %, 0.2 wt. %, 0.3 wt. %, etc. up to 99 wt. %.

As used herein, the term "low light intensity" when used in connection with growing conditions for rice crop means that the light intensity is less than 300 $\mu M/m^2/sec$. Preferably, the light intensity is less than 150 $\mu M/m^2/sec$.

As used herein, the term "high light intensity" when used in connection with growing conditions for rice crop means that the light intensity is greater than 700 $\mu M/m^2/sec$. Preferably, the light intensity is between 800 $\mu M/m^2/sec$ to 1000 $\mu M/m^2/sec$.

The subject invention relates to the use of safener(s) to enhance resistance of herbicide resistant rice crop to herbicides such that application of the herbicides will not significantly damage the herbicide resistant rice crop.

The effects of herbicides on rice crop vary greatly and are unpredictable. Frequently, herbicides that are highly potent against weedy rice are also toxic to the rice crop and may damage the rice crop. As such, there is a need in the art for herbicidal mixtures and compositions that effectively control weedy rice and do not significantly damage the rice crop.

The present invention provides an herbicidal mixture for controlling undesired vegetation in the vicinity of an herbicide resistant rice crop, wherein the herbicidal mixture comprises a) an acetyl CoA carboxylase (ACCase) inhibiting herbicide or a 4-hydroxyphenylpyruvate dioxygenase (HPPD) inhibiting herbicide or an ALS (AHAS) inhibiting herbicide or any combination thereof and b) at least one herbicide safener selected from isoxadifen, cloquintocet, AD-67, benoxacor and fenclorim, and esters, salts and combinations thereof.

In some embodiments, the herbicidal mixture comprises an ACCase inhibiting herbicide. ACCase inhibiting herbicides may include but are not limited to propaquizafop, quizalofop, quizalofop-P-ethyl, quizalofop-P-terfuryl, quiazlofop-P-methyl, and fluazifop-p and ester derivatives thereof. In some embodiments, the ACCase inhibiting herbicide is propaquizafop. In some embodiments, the ACCase inhibiting herbicide is quizalofop.

In some embodiments, the herbicidal mixture comprises an HPPD inhibiting herbicide. HPPD inhibiting herbicides may include but are not limited to mesotrione, tembotrione isoxaflutole, and topramezone. In some embodiments, the HPPD inhibiting herbicide is mesotrione. In some embodiments, the HPPD inhibiting herbicide is temnbotrione. In some embodiments, the HPPD inhibiting herbicide is isoxaflutole.

In some embodiments, the herbicidal mixture comprises an ALS (AHAS) inhibiting herbicide. ALS (AHAS) inhibiting herbicides may include but are not limited to inazethapyr, imazamox, imazpic, and imazapyr. In some embodiments, the ALS (AHAS) inhibiting herbicide is imazethapyr. In some embodiments, the ALS (AHAS) inhibiting herbicide is imazapyr. In some embodiments, the ALS (AHAS) inhibiting herbicide is imazamox.

Herbicide safeners that may be used in the mixtures and compositions of the subject application may include but are not limited to 8-quinolinyl-oxy acetic acids (such as cloquintocet-mexyl), 1-phenyl-5-haloalkyl-1,2,4-triazole-3-carboxyic acids (such as fenchlorazole and fenchlorazole-ethyl), 1-phenyl-5-alkyl-2-pyrazoline-3,5-dicarboxylic acid (such as mefenpyr and mefenpyr-diethyl), 4.5-dihydro-5,5-diaryl-1,2-oxazole-3-carboxyli acids (such as isoxadifen and isoxadifen-ethyl), di-chloroacetamides (such as dichlormid, furilazole, benoxacor and dicyclonon), alpha- (alkoxy-imino)-benzeneacetonitrile (such as cyometrinil and oxabetrinil), acetophenone oximes (such as fluxofenim), 4,6-dihalogeno-2-phenylpyrimidines (such as fenclorim), N-((4-alkylcarbamoyl)-phenylsulfonyl)-2-benzamides (such as cyprosulfamide), 1,8-naphthalic anhydride, 2-halo-4-haloalkyl-1,3-thiazole-5-carboxylic acids and 2-halo-4-haloalkyl-1,3-thiazole-5-carboxylates (such as flurazole), N-alkyl-O-phenyl carbamates (such as mephenate), N-alkyl-N'-aryl ureas (such as daimuron and cumyluron), S-alkyl-N-alkyl-thiocarbamates (such as dimepiperate) and phosphorothioates (such as dietholate) as well as their agriculturally useful salts; as well as their agriculturally useful derivatives, such as amides, esters and thioesters in case of present carboxylic acid functions.

In some embodiment, the herbicide safener is isoxadifen. In some embodiments, the herbicide safener is cloquintocet. In some embodiments, the herbicide safener is AD-67. In some embodiments, the herbicide safener is benoxacor. In some embodiments, the herbicide safener is fenclorim.

In some embodiments, the weight ratio of the herbicide to the herbicide safener in the herbicidal mixture is from 1:4 to 10:1. In some embodiments, the weight ratio of the herbicide to the herbicide safener in the herbicidal mixture is 1:4 or 1:3 or 1:2 or 1:1 or 2:1 or 3:1 or 4:1 or 5:1 or 6:1, or 7:1 or 8:1 or 9:1 or 10:1.

In some embodiments, the herbicidal mixture comprises from about 0.1% to about 99% by weight of the herbicide. In some embodiments, the herbicidal mixture comprises from about 0.1% to about 25% by weight of the herbicide. In some embodiments, the herbicidal mixture comprises from about 25% to about 50% by weight of the herbicide. In some embodiments, the herbicidal mixture comprises from about 50% to about 75% by weight of the herbicide. In some embodiments, the herbicidal mixture comprises from about 75% to about 99% by weight of the herbicide.

In some embodiments, the herbicidal mixture comprises from about 0.1% to about 90% by weight of the safener. In some embodiments, the herbicidal mixture comprises from about 0.1% to about 25% by weight of the safener. In some embodiments, the herbicidal mixture comprises from about 25% to about 50% by weight of the safener. In some embodiments, the herbicidal mixture comprises from about 50% to about 75% by weight of the safener. In some embodiments, the herbicidal mixture comprises from about 75% to about 90% by weight of the safener.

In some embodiments, the rice crop is herbicide resistant. In some embodiments, the herbicide resistant rice crop has at least one genetic mutation that confer resistance.

In some embodiments, the herbicide resistant rice crop is resistant to an ACCase inhibiting herbicide. In some embodiments, the herbicide resistant crop is resistant to a HPPD inhibiting herbicide, In some embodiments, the herbicide resistant rice crop is resistant to an ALS (AHAS) inhibiting herbicide.

In some embodiments, the herbicide resistant rice crop is resistant to an ACCase or HPPD or ATS inhibiting herbicide or any combination thereof and the safener is effective for increasing the resistance of the herbicide resistant rice crop to the ACCase or HPPD or ALS (AHAS) inhibiting herbicide or a combination thereof in the herbicidal mixture.

In some embodiments, the herbicide resistant rice crop is resistant to an ACCase inhibiting herbicide and the safener is effective for increasing the resistance of the herbicide resistant rice crop to the ACCase inhibiting herbicide in the herbicidal mixture. In some embodiments, the herbicide resistant crop is resistant to a HPPD inhibiting herbicide and the safener is effective for increasing the resistance of the herbicide resistant rice crop to the HPPD inhibiting herbicide in the herbicidal mixture. In some embodiments, the herbicide resistant rice crop is resistant to an ALS (AHAS) inhibiting herbicide and the safener is effective for increasing the resistance of the herbicide resistant rice crop to the ALS (AHAS) inhibiting herbicide in the herbicidal mixture.

In some embodiments, the combination of the safener and the mutation is effective for increasing the ED50 of the herbicide.

In some embodiments, the safener, when applied to the resistant rice crop, is effective for increasing the ED50 of the herbicide.

In some embodiments, the herbicide resistant rice crop is resistant to an ACCase inhibiting herbicide that is the same as the ACCase inhibiting herbicide in the herbicidal mixture. In some embodiments, the herbicide resistant rice crop is resistant to an ACCase inhibiting herbicide different from the ACCase inhibiting herbicide in the herbicidal mixture.

In some embodiments, the herbicide resistant rice crop is resistant to an HPPD inhibiting herbicide that is the same as the HPPD inhibiting herbicide in the herbicidal mixture. In some embodiments, the herbicide resistant rice crop is resistant to an HPPD inhibiting herbicide different from the HPPD inhibiting herbicide in the herbicidal mixture.

In some embodiments, the herbicide resistant rice crop is resistant to an ALS (AHAS) inhibiting herbicide that is the same as the ALS (AHAS) inhibiting herbicide in the herbicidal mixture. In some embodiments, the herbicide resistant rice crop is resistant to an ALS (AHAS) inhibiting herbicide different from the ALS (AHAS) inhibiting herbicide in the herbicidal mixture.

In some embodiments, the herbicide resistant rice crop contains 1, or 2, or 3 or more genes that confer resistance to HPPD inhibiting herbicides.

In some embodiments, the herbicide resistant rice crop contains 1, or 2, or 3 or more genes that confer resistance to ACCase inhibiting herbicides.

In some embodiments, the herbicide resistant rice crop contains 1, or 2, or 3 or more genes that confer resistance to ALS (AHAS) inhibiting herbicides.

In some embodiments, the undesired vegetation is monocots, divots and sedges. In some embodiments, the monocot is weedy rice, barnyardgrass, sprangletop species, broadleaf signalgrass, crabgrass, panicum, or other grass species. In some embodiments, the weedy rice is red rice. In some embodiments, the sedge is yellow nutsedge, morningglory species, or hemp sesbania.

In some embodiments, environmental conditions affect the degree of resistance of the herbicide resistant rice crop to the ACCase inhibiting herbicide or the HPPD inhibiting herbicides or the ALS (AHAS) inhibiting herbicide or combinations thereof. In some embodiments, the degree of resistance of the herbicide resistant rice crop to the ACCase inhibiting herbicide or the HPPD inhibiting herbicides or the ALS (AHAS) inhibiting herbicide or combinations thereof is reduced when the herbicide resistant rice crop is grown under low light intensity conditions compared to high light intensity conditions.

In some embodiments, the herbicide safener is effective in reducing phytotoxic action of the herbicide on the herbicide resistant rice crop grown under low light intensity conditions. In some embodiments, the herbicide safener is effective in reducing phytotoxic action of the herbicide on the herbicide resistant rice crop grown under high light intensity conditions.

In some embodiments, the herbicide safener is effective in increasing resistance of the herbicide resistant rice crop grown under low light intensity conditions. In some embodiments, the herbicide safener is effective in increasing resistance of the herbicide resistant rice crop grown under high light intensity conditions.

The level of phytotoxicity and/or the protective effect of the safener may be measured by regrowth of the plant, including the height and/or weight of the fresh tissue that regrew over a defined period of time, after the top portion of the plant is cut.

In some embodiments, environmental condition may include but are not limited to light intensity and temperature.

Degree of herbicide resistance of a crop is influenced by its growth and metabolism rate.

For example, under low light intensity condition such as cloudy or foggy and/or at low temperatures such as less than 65° F., the crop growth and metabolism rate is reduced and therefore the herbicidal resistance of the crop is decreased.

In some embodiments, the safener is effective for reducing the phytotoxic action of the herbicide on the herbicide resistant rice crop by at least 10% compared to phytotoxic action of the herbicide on the same rice crop to which the safener was not applied. In some embodiments, the safener is effective for reducing the phytotoxic action of the herbicide on the herbicide resistant rice crop by at least 15% compared to the phytotoxic action of the herbicide on the same rice crop to which the safener was not applied. In some embodiments, the safener is effective for reducing the phytotoxic action of the herbicide on the herbicide resistant rice crop by at least 20% compared to the phytotoxic action of the herbicide on the same rice crop to which the safener was not applied.

In some embodiments, the safener is effective for increasing the resistance of the herbicide resistant rice crop to the herbicide by at least 10% compared to the resistance of the same rice crop to which the safener was not applied. In some embodiments, the safener is effective for increasing the resistance of the rice crop to the herbicide by at least 15% compared to the resistance of the same rice crop to which the safener was not applied. In some embodiments, the safener is effective for increasing the resistance of the rice crop to the herbicide by at least 70% compared to the resistance of the same rice crop to which the safener was not applied.

In some embodiments, the safener is effective for reducing herbicide effects in the herbicide resistant rice crop by at least 10% compared to the herbicide effects in the same rice crop to which the safener was not applied. In some embodiments, the safener is effective for reducing herbicide effects in the herbicide resistant rice crop by at least 15% compared to the herbicide effects in the same rice crop to which the safener was not applied. In some embodiments, the safener is effective for reducing herbicide effects in the herbicide resistant rice crop by at least 20% compared to the herbicide effects in the same rice crop to which the safener was not applied. In some embodiments, the safener is effective for reducing herbicide effects in the herbicide resistant rice crop by at least 70% compared to the herbicide effects in the same rice crop to which the safener was not applied.

The present invention also provides an herbicidal composition for controlling undesired vegetation in the vicinity of an herbicide resistant rice crop, wherein the herbicidal composition comprises any one of the herbicidal mixtures disclosed herein and at least one agriculturally acceptable carrier.

In some embodiments, the amount of the herbicide and the safener in the composition is about 0.1-99 wt. % based on the total weight of the composition. In some embodiments, the amount of the herbicide and the safener in the composition is about 0.1-25 wt. % based on the total weight of the composition. In some embodiments, the amount of the herbicide and the safener in the composition is about 25-50 wt. % based on the total weight of the composition. In some embodiments, the amount of the herbicide and the safener in the composition is about 50-75 wt. % based on the total weight of the composition. In some embodiments, the amount of the herbicide and the safener in the composition is about 75-99 wt. % based on the total weight of the composition.

In some embodiments, the agriculturally acceptable carrier is selected from surfactants, solid carriers, liquid carriers and combinations thereof.

Examples of suitable surfactants include, but are not limited to, non-ionic, anionic, cationic and ampholytic types such as alkoxylated fatty alcohols, ethoxylated polysorbate (e.g. tween 20), ethoxylated castor oil, lignin sulfonates, fatty acid sulfonates (e.g. lauryl sulfonate), phosphate esters such as phosphate esters of alcohol alkoxylates, phosphate esters of alkylphenol alkoxylates and phosphate esters of styrylphenol ethoxylates, condensates of sulfonated naphthalene and naphthalene derivatives with formaldehyde, condensates of naphthalene or of naphthalenesulfonic acid with phenol and formaldehyde, alkylarylsulfonates, ethoxylated alkylphenols and aryl phenols, polyalkylene glycols sorbitol esters, alkali metal, sodium salts of lignosulphonates, tristyrylphenol ethoxylate phosphate esters, aliphatic alcohol ethoxylates, alkylphenol ethoxylates, ethylene oxide/propylene oxide block copolymers, graft copolymers and polyvinyl alcohol-vinyl acetate copolymers. Other surfactants known in the art may be used as desired.

Examples of suitable liquid carriers useful in the present compositions include, but are not limited to, water; aromatic hydrocarbons such as alkylbenzenes and alkylnaphthalenes; alcohols such as methanol, cyclohexanol, and decanol; ethylene glycol; polypropylene glycol; dipropropylene glycol; N,N-dimethylformamide; ditnethylsulfoxide; dimethylacetamide; N-alkylpyrrolidones such as N-methyl-2-pyrrolidone; paraffins; various oils such as olive, castor, linseed, tung, sesame, corn, peanut, cotton-seed, soybean, rape-seed, or coconut oil; fatty acid esters; ketones such as cyclohexanone, 2-heptanone, isophorone, and 4-hydroxy-4-methyl-2-pentanone; and the like.

Examples of suitable solid carriers useful in the present compositions include, but are not limited to, mineral earths such as silica gels, silicates, talc, kaolin, sericite, attaclay, limestone, bentonite, lime, chalk, bole, mirabilite, loess, clay, dolomite, zeolite, diatomaceous earth, calcium carbonate, calcium sulfate, magnesium sulfate, magnesium oxide, sodium carbonate and bicarbonate, and sodium sulfate; ground synthetic materials; fertilizers such as ammonium sulfate, ammonium phosphate, ammonium nitrate, ureas, and products of vegetable origin, such as cereal meal, tree bark meal, wood meal, and nutshell meal; cellulose powders; and other solid carriers.

In some embodiments, the herbicidal composition further comprises at least one additional component selected from the group of wetting agents, anti-foaming agents, adhesives, neutralizers, thickeners, binders, sequestrates, fertilizers, and anti-freeze agents.

The present invention also provides an herbicidal composition for controlling undesired vegetation in the vicinity of an herbicide resistant rice crop, wherein the herbicidal composition comprises a) at least one ACCase inhibiting herbicide or ALS (AHAS) inhibiting herbicide or HPPD inhibiting herbicide or any combination thereof and b) at least one herbicide safener selected from isoxadifen, cloquintocet, AD-67, benoxacor and fenclorim, and esters, salts and combinations thereof.

The present invention provides an herbicidal composition comprising a) an ACCase inhibiting herbicide or an ALS (AHAS) inhibiting herbicide or a HPPD inhibiting herbicide, and b) at least one herbicide safener selected from isoxadifen, cloquintocet, AD-67, benoxacor and fenclorim, and esters, salts and combinations thereof.

The present invention also provides an herbicidal composition comprising (i) a mixture of propaquizafop and isoxadifen, and (ii) at least one agriculturally acceptable carrier.

The present invention also provides an herbicidal composition comprising (i) a mixture quizalofop and isoxadifen, and (ii) at least one agriculturally acceptable carrier.

The present invention also provides an herbicidal composition comprising (i) a mixture of imazethapyr and isoxadifen, and (ii) at least one agriculturally acceptable carrier.

The present invention also provides an herbicidal composition comprising (i) a mixture of imazamox and isoxadifen, and (ii) at least one agriculturally acceptable carrier.

The present compositions can be made at the time of use or diluted at the time of use. The present compositions can also be ready-to-use compositions.

The present compositions may he employed or prepared in any conventional form, for example, in the form of a twin pack, or for example, as wettable powders (WP), emulsion concentrates (EC), microemulsion concentrates (MEC), water-soluble powders (SP), water-soluble concentrates (SL), suspoemulsion (SE), oil dispersions (OD), concentrated emulsions (BW) such as oil-in-water and water-in-oil emulsions, sprayable solutions or emulsions, capsule suspensions (CS), suspension concentrates (SC), suspension concentrates, dusts (DP), oil-miscible solutions (OL), granules (GPO in the form of microgranules, spray granules, coated granules and absorption granules, granules for soil application or broadcasting, water-soluble granules (SG), water-dispersible granules (WDG), ULV formulations, microcapsules or waxes. These individual formulation types are known in the art.

The present compositions may also be formulated as seed treatment compositions. For seed treatment, the compositions may be formulated in the form of powder for dry seed treatment (DS), gel for seed treatment (GF), water dispersible powder for slurry seed treatment (WS), water soluble powder for seed treatment (SS), solution for seed treatment (LS), emulsion for seed treatment (ES), suspension concentrate (SC), flowable concentrate for seed treatment (FS), capsule suspension (CS), seed coated with a pesticide (PS).

Preferably, the compositions for seed treatment are formulated in the form of emulsions for seed treatment (ES), suspension concentrates (SC), flowable concentrate for seed treatment (FS) and capsule suspension (CS). Such compositions can be formulated using agriculturally acceptable carriers, surfactants or other application-promoting adjuvants customarily employed in formulation technology and formulation techniques that are known in the art.

Aqueous use forms can be prepared from emulsion concentrates, suspensions, pastes, wettable powders or water-dispersible granules by adding water. To prepare emulsions, pastes or oil dispersions, the components of the compositions either as such or dissolved in an oil or solvent, can be homogenized in water by means of a wetting agent, thickener, dispersant or emulsifier. Alternatively, it is also possible to prepare concentrates comprising active ingredient, wetting agent, thickener, dispersant or emulsifier and, if desired, solvent or oil, which are suitable for dilution with water.

A seed dressing composition may be applied to the seeds by formulating a safener and a diluent in suitable seed dressing composition form (as discussed hereinabove). Seed dressing compositions may contain the single active ingredients or the combination of active ingredients in for example encapsulated form. In some embodiments, a tank-mix composition for seed treatment application may comprise 1-85 wt. % of the herbicide and the safener based on the total weight of the composition, with the remainder of the composition comprising solid or liquid auxiliaries (including, for example, solvents, surfactants, etc.). A typical pre-mix composition for seed treatment application may comprise 0.5-99.9 wt. % of the herbicide and the safener based on the total weight of the composition, with the remainder of the composition comprising solid or liquid auxiliaries (including, for example, solvents, surfactants, etc.).

The present invention also provides a method of controlling undesired vegetation in the vicinity of an herbicide resistant rice crop comprising applying any one of the herbicidal mixtures disclosed herein to a locus of the undesired vegetation so as to effectively control the undesired vegetation.

The present invention also provides a method of controlling undesired vegetation in the vicinity of an herbicide resistant rice crop comprising applying any one of the herbicidal compositions disclosed herein to a locus of the undesired vegetation so as to effectively control the undesired vegetation.

In some embodiments, the herbicidal mixture is applied at a rate from 1 g/ha to 600 g/ha. In some embodiments, the herbicidal mixture is applied at a rate from 1 g/ha to 500 g/ha. In some embodiments, the herbicidal mixture is applied at a rate from 1 g/ha to 300 g/ha. In some embodiments, the herbicidal mixture is applied at a rate from 80 g/ha to 300 g/ha. In some embodiments, the herbicidal mixture is applied at a rate of 125 g/ha. In some embodiments, the herbicidal mixture is applied at a rate from 350 g/ha to 500 g/ha.

In some embodiments, the herbicidal mixture is applied at a rate from 0.1 liter/ha to 300 liter/ha. In some embodiments, the herbicidal mixture is applied at a rate from 100 liter/ha to 300 liter/ha. In some embodiments, the herbicidal mixture is applied at a rate of about 200 liter/ha. In some embodiments, the herbicidal mixture is applied at a rate from 0.1 liter/ha to 10 liter/ha. In some embodiments, the herbicidal mixture is applied at a rate from 0.2 liter/ha to 5 liter/ha. In some embodiments, the herbicidal mixture is applied at a rate of 1.25 liter/ha.

In some embodiments, the herbicidal mixture may be applied to seeds of the rice crop as seed treatment before planting. In some embodiments, the herbicidal mixture applied to the seeds at a rate from 0.1 g/100 kg of seeds to 1000 g/100 kg of seeds. In some embodiments, the herbicidal mixture is applied to the seeds at a rate from 1 g/100 kg of seeds to 750 g/100 kg of seeds. In a further embodiment, the herbicidal mixture is applied to the seeds at a rate from 30 g/100 kg of seeds to 300 g/100 kg of seeds.

In some embodiments, the method comprises applying an effective amount of an ACCase inhibiting herbicide. ACCase inhibiting herbicides may include but are not limited to propaquizafop, quizalofop, quizalofop-P-ethyl, quizalofop-P-terfuryl, and quizalofop-P-methyl. In some embodiments, the ACCase inhibiting herbicide is propaquizafop. In some embodiment, the ACCase inhibiting herbicide is quizalofop.

In some embodiments, the method comprises applying an effective amount of an HPPD inhibiting herbicide. HPPD inhibiting herbicides may include but are not limited to mesotrione and tembotrione. Isoxaflutole is another example of HPPD inhibiting herbicides.

In some embodiments, the method comprises applying an effective amount of an ALS (AHAS) inhibiting herbicide, ALS (AHAS) inhibiting herbicides may include but are not limited to imazethapyr, imazamox, imazpic, and imazapyr. In some embodiments, the ALS (AHAS) inhibiting herbicide is imazamox.

In some embodiments, the safener is isoxadifen.

In some embodiments, the method comprises applying two or more safeners to the herbicide resistant rice crop or the seeds thereof. In some embodiment, the method comprises treating the herbicide resistant rice crop or the seeds thereof with a mixture of two or more safeners.

In some embodiments, the herbicide and/or safener is applied to the rice crop, the locus of the rice crop and/or the propagation material of the rice crop.

In some embodiments, the herbicide and/or the safener is applied to the locus of undesired vegetation pre-emergence. In some embodiments, the herbicide and/or the safener is applied to the locus of undesired vegetation post emergence.

The application rates of the combination may vary, depending on the desired effect, In some embodiments, the herbicide is applied at a rate that would inhibit growth of the rice crop if the herbicide was applied without the safener.

In some embodiments, the herbicide is applied at a rate from about 1 g/ha to about 250 g/ha. In some embodiments, the herbicide is applied at a rate from about 1 g/ha to about 200 g/ha. In some embodiments, the herbicide is applied at a rate from about 1 g/ha to about 150 g/ha. In some embodiments, the herbicide is applied at a rate from about 1 g/ha to about 75 g/ha. In some embodiments, the herbicide is applied at a rate from about 1 g/ha to about 20 g/ha. In some embodiments, the herbicide is applied at a rate from about 1 g/ha to about 10 g/ha.

In some embodiments, the herbicide is applied at a rate of 2 g/ha. In some embodiments, the herbicide is applied at a rate of 6 g/ha. In some embodiments, the herbicide is applied at a rate of 18 g/ha. In some embodiments, the herbicide is applied at a rate of 54 g/ha. In some embodiments, the herbicide is applied at a rate of 162 g/ha.

In some embodiments, the herbicide is applied at a rate of 2.2 g/ha. In some embodiments, the herbicide is applied at a rate of 6.6 g/ha. In some embodiments, the herbicide is applied at a rate of 19.7 g/ha. In some embodiments, the herbicide is applied at a rate of 54.9 g/ha. In some embodiments, the herbicide is applied at a rate of 177.3 g/ha.

In some embodiments, the herbicide is applied at a rate from about 25 g/ha to about 250 g/ha., In some embodiments, the herbicide is applied at a rate from about 25 g/ha to about 50 g/ha. In some embodiments, the herbicide is applied at a rate from about 50 g/ha to about 250 g/ha. In some embodiments, the herbicide is applied at a rate from about 50 g/ha to about 100 g/ha. In some embodiments, the herbicide is applied at a rate from about 100 g/ha to about 200 g/ha. In some embodiments, the herbicide is applied at a rate from about 200 g/ha to about 250 g/ha. In some embodiments, the herbicide is applied at a rate from about 30 g/ha to about 70 g/ha. In some embodiments, the herbicide is applied at a rate of about 5 g/ha. In some embodiments, the herbicide is applied at a rate of about 10 g/ha. In some embodiments, the herbicide is applied at a rate of about 15 g/ha. In some embodiments, the herbicide is applied at a rate of about 20 g/ha. In some embodiments, the herbicide is applied at a rate of about 30 g/ha. In some embodiments, the herbicide is applied at a rate of about 40 g/ha. In some embodiments, the herbicide is applied at a rate of about 50 g/ha. In some embodiments, the herbicide is applied at a rate of about 60 g/ha. In some embodiments, the herbicide is applied at a rate of about 70 g/ha.

In some embodiments, the safener is applied a rate from about 1 g/ha to about 150 g/ha. In some embodiments, the safener is applied a rate from about 1 g/ha to about 100 g/ha. In some embodiments, the safener is applied at a rate from about 5 g/ha to about 50 g/ha. In some embodiments, the safener is applied a rate from about 1 g/ha to about 12.5 g/ha. In some embodiments, the safener is applied at a rate from about 12.5 g/ha to about 25 g/ha. In some embodiments, the safener is applied a rate from about 25 g/ha to about 50 g/ha. In some embodiments, the safener is applied at a rate from about 50 g/ha to about 100 g/ha. In some embodiments, the safener is applied at a rate from about 100 g/ha to about 150 g/ha. In some embodiments, the safener is applied a rate from about 12.5 g/ha to about 100 g/ha. In some embodiments, the safener is applied a rate of about 12.5 g/ha. In some embodiments, the safener is applied a rate of about 25 g/ha. In some embodiments, the safener is applied a rate of about 50 g/ha. In some embodiments, the safener is applied a rate of 100 g/ha.

In some embodiments, the safener is applied to seeds of the herbicide resistant rice crop. In some embodiments, the safener is applied at a rate of 0.1 g to 5 g of safener per kg of seeds. In some embodiments, the safener is applied at a rate of 0.5 g to 2 g of safener per kg of seeds. In some embodiments, the safener is applied at a rate of 0.5 g to 1 g of safener per kg of seeds. In some embodiments, the safener is applied at a rate of 1 g to 2 g of safener per kg of seeds. In some embodiments, the safener is applied at a rate of 0.5 g of safener per kg of seeds. In some embodiments, the safener is applied at a rate of 1 g of safener per kg of seeds. In some embodiments, the safener is applied at a rate of 2 g of safener per kg of seeds.

In some embodiments, the herbicide and the safener are applied simultaneously, separately, or sequentially. In some embodiments, the herbicide and the safener are applied simultaneously in a tank mix.

In some embodiments, the weight ratio if the safener to the herbicide in the tank mix is from about 1:1 to about 1:5.

In some embodiments, the herbicide is applied one to three times during the growing season.

In some embodiments, the herbicide and the safener are prepared as separate formulations, and the individual formulations are applied as is, or diluted to predetermined concentrations. In other embodiments, the herbicide and the safener are prepared as separate formulations, and the formulations are mixed when diluted to a predetermined concentration. In other embodiments, the herbicide and the safener are prepared as separate formulations, and the formulations are mixed as tank mix before or after dilution to a predetermined concentration. In other embodiments, the herbicide and the safener are formulated together, and the formulation is applied as it is, or the formulation is diluted to a predetermined concentration.

In some embodiments, the herbicide and/or the safener are applied via foliar application, basal application, soil application, soil incorporation, soil injection or seed treatment.

In some embodiments, the safener is applied 7 days, 6 days, 5 days, 4 days, 3 days, 2 days, or 1 day before the herbicide application.

In some embodiments, the safener is applied 1 day, 2 days, 3 days, or 4 days after the herbicide application.

In some embodiments, the safener is applied parallel to application of the herbicide.

In some embodiments, the safener and herbicide are applied on the same day.

In some of the embodiments, the metabolism rate of the herbicide in the herbicide resistant rice crop is more than 3 days, 5 days, 10 days, 20 days, 30 days, or 50 days.

In some embodiments, the resistant herbicide resistant rice crop is resistant to an ACCase inhibiting herbicide. In some embodiments, the safener is effective for increasing the resistance of the herbicide resistant rice crop to the ACCase inhibiting herbicide compared to the resistance of the same rice crop to which the safener was not applied. In some embodiments, the safener is effective for reducing phytotoxic action of the of the ACCase inhibiting herbicide on the herbicide resistant rice crop compared to the phytotoxic action of the same herbicide on the same rice crop to which the safener was not applied. In some embodiments, the safener is effective for reducing herbicide effects of the ACCase inhibiting herbicide in the herbicide resistant rice crop compared to the herbicide effects in the same rice crop to which the safener was not applied.

In some embodiments, the herbicide resistant rice crop is resistant to a HPPD inhibiting herbicide. In some embodiments, the safener is effective for increasing the resistance of the herbicide resistant rice crop to the HPPD inhibiting herbicide compared to the resistance of the same rice crop to which the safener was not applied. In some embodiments, the safener is effective for reducing phytotoxic action of the of the HPPD inhibiting herbicide on the herbicide resistant rice crop compared to the phytotoxic action of the same herbicide on the same rice crop to which the safener was not applied. In some embodiments, the safener is effective for reducing herbicide effects of the HPPD inhibiting herbicide in the herbicide resistant rice crop compared to the herbicide effects in the same rice crop to which the safener was not applied.

In some embodiments, the herbicide resistant rice crop is resistant to an ALS (AHAS) inhibiting herbicide. in some embodiments, the safener is effective for increasing the resistance of the herbicide resistant rice crop to the ALS (AHAS) inhibiting herbicide compared to the resistance of the same rice crop to which the safener was not applied. In some embodiments, the safener is effective for reducing phytotoxic action of the of the ALS (AHAS) inhibiting herbicide on the herbicide resistant rice crop compared to the phytotoxic action of the same herbicide on the same rice crop to which the safener was not applied. In some embodiments, the safener is effective for reducing herbicide effects of the ALS (AHAS) inhibiting herbicide in the herbicide resistant rice crop compared to the herbicide effects in the same rice crop to which the safener was not applied.

In some embodiments, the herbicide resistant rice crop is resistant to an ACCase inhibiting herbicide that is the same as the applied ACCase inhibiting herbicide. In some embodiments, the herbicide resistant rice crop is resistant to an ACCase inhibiting herbicide different from the applied ACCase inhibiting herbicide.

In some embodiments, the resistant herbicide rice crop is resistant to an HPPD inhibiting herbicide that is the same as the applied HPPD inhibiting herbicide, in some embodiments, the herbicide resistant rice crop is resistant to an HPPD inhibiting herbicide different from the applied HPPD inhibiting herbicide.

In some embodiments, the herbicide resistant rice crop is resistant to an ALS (AHAS) inhibiting herbicide that is the same as the applied ALS (AHAS) inhibiting herbicide. In some embodiments, the herbicide resistant rice crop is resistant to an ALS (AHAS) inhibiting herbicide different from the applied ALS (AHAS) inhibiting herbicide.

In sonic embodiments, the undesired vegetation is monocot, dicot or sedge. In some embodiments, the monocot is weedy rice, barnyardgrass, sprangletop species, broadleaf signalgrass, crabgrass, panicum or other grass species. In some embodiments, the weedy rice is red rice. In some embodiments, the sedge is yellow nutsedge, morningglory species, or hemp sesbania.

The present invention also provides a method of controlling undesired vegetation in the vicinity of a herbicide resistant rice crop comprising applying a) an effective amount of an ACCase inhibiting herbicide or an HPPD inhibiting herbicide or an ALS (AHAS) inhibiting herbicide or any combination thereof, and b) an effective amount of at least one herbicide safener selected from isoxadifen, cloquintocet, AD-67, benoxacor and fenclorim, and esters, salts and combinations thereof to a locus of the undesired vegetation so as to effectively control the undesired vegetation.

The present invention also provides a method of reducing phytotoxic action of an ACCase inhibiting herbicide and/or an HPPD inhibiting herbicide and/or ALS (AHAS) inhibiting herbicide on a herbicide resistant rice crop, wherein the method comprises applying an effective amount of at least one safener selected from isoxadifen, cloquintocet, AD-67, benoxacor and fenclorim, and esters, salts and combinations thereof to the herbicide resistant rice crop so as to effectively reduce the phytotoxic action of the ACCase inhibiting herbicide and/or the HPPD inhibiting herbicide and/or ALS (AHAS) inhibiting herbicide on the herbicide resistant rice crop compared to the same rice crop to which the safener was not applied.

The present invention also provides a method of increasing resistance of herbicide resistant rice crop to an ACCase inhibiting herbicides and/or an HPPD inhibiting herbicides and/or an ALS (AHAS) inhibiting herbicides comprising applying an effective amount of at least one safener selected from cloquintocet, AD-67, isoxadifen, benoxacor and fenclorim, and esters, salts and combinations thereof to the herbicide resistant rice crop with so as to increase resistance of the herbicide resistant rice crop to the ACCase inhibiting herbicides and/or the HPPD inhibiting herbicides and/or the ALS (AHAS) inhibiting herbicides compared to the resistance of the same rice crop to which the safener was not applied.

The present invention also provides a method for reducing herbicide effects of an ACCase inhibiting herbicides and/or an HPPD inhibiting herbicides and/or an ALS (AHAS) inhibiting herbicides in herbicide resistant rice crop, comprising applying at least one safener selected from isoxadifen, cloquintocet, AD-67, benoxacor and fenclorim, and esters, salts and combinations thereof to a plant and/or seed of the herbicide resistant rice crop so as to thereby reduce herbicide effects in the herbicide resistant rice crop compared to the herbicide effects in the same rice crop to which the safener was not applied.

In some embodiments, the safener is applied to the herbicide resistant rice crop 7 days, 6 days, 5 days, 4 days, 3 days, 2 days, or 1 day before the herbicide application.

In some embodiments, the safener is applied to the herbicide resistant rice crop 1 day, 2 days, 3 days, or 4 days after the herbicide application.

In some embodiments, the safener is applied to the herbicide resistant rice crop parallel to application of the herbicide.

In some embodiments, the safener and herbicide are applied to the herbicide resistant rice crop on the same day.

In some of the embodiments, the metabolism rate of the herbicide in the herbicide resistant rice crop is more than 3 days, 5 days, 10 days, 20 days, 30 days, or 50 days.

The present invention also provides a method for increasing resistance to an ACCase inhibiting herbicide and/or an HPPD inhibiting herbicide and/or an ALS (ATLAS) inhibiting herbicide in herbicide resistant rice crop wherein the herbicide resistant rice crop is treated with at least one safener selected from isoxadifen, cloquintocet, AD-67, benoxacor and fenclorim, and esters, salts and combinations thereof.

The present invention also provides an herbicide resistant rice crop with increased resistance to an ACCase inhibiting herbicide and/or an HPPD inhibiting herbicide and/or an ALS (AHAS) inhibiting herbicide wherein the rice crop is treated with at least one safener selected from isoxadifen, cloquintocet, AD-67, benoxacor and fenclorim, and esters, salts and combinations thereof.

The present invention also provides a rice crop resistant to an ACCase inhibiting herbicide and/or an HPPD inhibiting herbicide and/or ALS (AHAS) wherein the rice crop is treated with at least one safener selected from cloquintocet, AD-67, isoxadifen, benoxacor and fenclorim, and esters, salts and combinations thereof.

The present invention also provides a rice crop treated with at least one safener selected from isoxadifen, cloquintocet, AD-67, benoxacor and fenclorim, and esters, salts and combinations thereof.

The present invention also provides a kit comprising any one of the herbicidal mixtures or compositions disclosed herein, or components thereof. Such kits may comprise, in addition to the aforementioned active ingredients, one or more additional active and/or inactive ingredients such as adjuvant, either within the provided herbicidal composition or separately. Certain kits comprise an herbicidal and an herbicidal safener, each in a separate container, and each optionally combined with a carrier.

The present invention also provides a synergistic combination comprising (i) at least one mutant rice crop resistant to an ACCase inhibiting herbicide or an ALS (AHAS) inhibiting herbicide or a HPPD inhibiting herbicide or any combination thereof and (ii) at least one herbicide safener selected from isoxadifen, cloquintocet, AD-67, benoxacor and fenclorim, and esters, salts and combinations thereof.

The present invention also provides a synergistic combination comprising (i) at least one rice crop resistant to an ACCase inhibiting herbicide or an ALS (AHAS) inhibiting herbicide or a HPPD inhibiting herbicide or any combination thereof and (ii) at least one herbicide safener selected from isoxadifen, cloquintocet, AD-67, benoxacor and fenclorim, and esters, salts and combinations thereof.

In the field of agriculture, it is often understood that the term "synergy" is as defined by Colby S. R. in an article entitled "Calculation of the synergistic and antagonistic responses of herbicide combinations" published in the journal Weeds, 1967, 15, p. 20-22. The expected effect for a given combination of two active components can be calculated as follows:

$$E = X + Y - \frac{XY}{100}$$

in which E represents the expected effect for the combination of the two active components and X and Y represents the effect of each active component alone. There is synergism when the observed effect for the combination is greater than the expected effect for the combination as calculated using the Colby equation.

In the context of the subject invention, E represents the expected level of resistance when the safener is applied to mutant rice crop at the defined doses of herbicide. X is the level of resistance when the safener is applied to wildtype rice crop at the defined doses of herbicide. Y is the level of resistance for mutant rice crop at the defined doses of herbicide without safener application. When the level of resistance observed for the application of safener on mutant rice crop at the defined doses of herbicide is greater than the expected level of resistance as calculated using the Colby equation, there is a synergistic effect.

In the subject application, synergism is also shown when the application of herbicide to a mutant rice crop in the presence of safener results in a higher level of resistance to the herbicides than (i) when the herbicide is applied to wildtype rice crop in the presence of safener, i.e. the level of resistance attributable to safener alone, or (ii) when the herbicide is applied to mutant rice crop without safener, i.e. the level of resistance attributable to mutation alone.

The present invention provides an herbicidal mixture for controlling undesired vegetation in the vicinity of rice crop, wherein the herbicidal mixture comprises a) an acetyl CoA carboxylase (ACCase) inhibiting herbicide or an acetolactate (or acetohydroxy acid) synthase (ALS or AHAS) inhibiting herbicide or a 4-hydroxyphenylpyruvate dioxygenase (HPPD) inhibiting herbicide or any combination thereof and b) at least one herbicide safener selected from isoxadifen, cloquintocet, AD-67, benoxacor and fenclorim, and esters, salts and combinations thereof.

The present invention also provides an herbicidal composition for controlling undesired vegetation in the vicinity of rice crop, wherein the herbicidal composition comprises any one of the herbicidal mixtures disclosed herein and at least one agriculturally acceptable carrier.

The present invention also provides an herbicidal composition for controlling undesired vegetation in the vicinity of rice crop, wherein the herbicidal composition comprises a) at least one ACCase inhibiting herbicide or ALS (AHAS) inhibiting herbicide or HPPD inhibiting herbicide or any combination thereof and b) at least one herbicide safener selected from isoxadifen, cloquintocet, AD-67, benoxacor and fenclorim, and esters, salts and combinations thereof.

The present invention also provides an herbicidal composition comprising (i) a mixture quizalofop and isoxadifen, and (ii) at least one agriculturally acceptable carrier.

The present invention also provides a method of controlling undesired vegetation in the vicinity of rice crop comprising applying any one of the herbicidal mixtures or compositions disclosed herein to a locus of the undesired vegetation so as to effectively control the undesired vegetation.

The present invention also provides a method of controlling undesired vegetation in the vicinity of rice crop comprising applying a) an effective amount of an ACCase inhibiting herbicide or an HPPD inhibiting herbicide or an ALS (AHAS) inhibiting herbicide or any combination thereof and b) an effective amount of at least one herbicide safener selected from isoxadifen, cloquintocet, AD-67, benoxacor and fenclorim and esters, salts and combinations thereof to a locus of the undesired vegetation so as to effectively control the undesired vegetation.

The present invention also provides a method of reducing phytotoxic action of an ACCase inhibiting herbicide and/or an HPPD inhibiting herbicide and/or an ALS (AHAS) inhibiting herbicide on a rice crop, wherein the method comprises applying an effective amount of at least one safener selected from isoxadifen, cloquintocet, AD-67, benoxacor and fenclorim, and esters, salts and combinations thereof to the rice crop so as to effectively reduce the phytotoxic action of the ACCase inhibiting herbicide and/or the HPPD inhibiting herbicide and/or the ALS (AHAS) inhibiting herbicide on the herbicide resistant rice crop compared to the phytotoxic action on the same rice crop to which the safener was not applied.

The present invention also provides a method of increasing resistance of a rice crop to an ACCase inhibiting herbicide and/or an ALS (AHAS) inhibiting herbicide and/or a HPPD inhibiting herbicide comprising applying an effective amount of at least one safener selected from isoxadifen, cloquintocet, AD-67, benoxacor and fenclorim, and esters, salts and combinations thereof to the herbicide resistant rice crop with so as to thereby increase resistance of the herbicide resistant rice crop to the ACCase inhibiting herbicide and/or the ALS (AHAS) inhibiting herbicide and/or the HPPD inhibiting herbicide compared to the resistance of same rice crop to which the safener was not applied.

The present invention also provides a rice crop treated with at least one safener selected from isoxadifen, cloquintocet, AD-67, benoxacor and fenclorim, and esters, salts and combinations thereof.

The present invention also provide a method of controlling undesired vegetation in the vicinity of a rice crop comprising (i) applying at least one safener selected from isoxadifen, cloquintocet, AD-67, benoxacor and fenclorim, and esters, salts and combinations thereof to a seed of the herbicide resistant rice crop and (ii) applying an effective amount of an ACCase inhibiting herbicide or an HPPD inhibiting herbicide or an ALS (AHLS) inhibiting herbicide or any combination thereof to a locus of the undesired vegetation so as to effectively control the undesired vegetation.

Each embodiment disclosed herein is contemplated as being applicable to each of the other disclosed embodiments. Thus, all combinations of the various elements described herein are within the scope of the invention. In addition, the elements recited in mixture embodiments can be used in the composition, methods, use, kit and rice crop embodiments described herein and vice versa.

Examples are provided below to facilitate a more complete understanding of the present subject matter. The following examples illustrate the exemplary modes of making and practicing the present subject matter. However, the scope of the present subject matter is not limited to specific embodiments disclosed in these Examples, which are for purposes of illustration only. Other embodiments will be apparent to one skilled in the art from consideration of the specification and examples. It is intended that the specification, including the examples, is considered exemplary only without limiting the scope and spirit of the present subject matter.

EXPERIMENTAL DETAILS

Example 1: Effects of Propaquizafop, Quizalofop and Safeners on Mutant Rice

Mutant Rice

Seeds of a proprietary ACCase resistant rice variety, i.e. RTA1, was used. RTA1, ML0831265-01493 (ATCC deposit PTA-12933, mutation G2096S) variety rice seeds were supplied by RiceTec. RTA1 rice cultivar contains a single mutation in the ACCase gene that confer ACCase resistance. The mutation makes the enzyme insensitive to quizalofop.

Other ACCase resistant and/or ALS (AHAS) resistant and/or HPPD resistant rice varieties including but not limited to ML0831266-03093 (ATCC deposit PTA-13620), PL121448M2-80048 (ATCC deposit PTA-121362) and PL1214418M2-73009 (ATCC deposit PTA-121398) may similarly be used.

Growing Conditions, Materials and Methods

Mutant rice seeds were planted in commercial greenhouse soil mix in 10×10×10 cm plastic pots. 250 mL of soil was put into each pot, then the seeds were placed on top of the soil and the seeds were covered with 100-150 mL of soil. Approximately 8-10 seeds were planted per pot. The pots were then watered with 100 mL of a mixture of Miracle Grow and Fertiplus (iron supplement). The pots were placed in the greenhouse (38° C./20° C. day/night, 14 h photoperiod with supplemental light). The average light intensity in the greenhouse was 150 μM/m$^2$/sec.

Plants were grown until 10 days after planting and then the pots were transferred to trays and the plants were grown under water. :Plants were treated when they reached the 3-5 leaf stage.

Herbicide and Safener Application

Generally, plants were treated with 40 g/ha of quizalofop P-ethyl (Assure® II sold by DuPont™) or 50 g/ha of propaquizafop through a moving nozzle spray system in a spray volume of 200 l/ha. Safeners were tank mixed with the herbicide in the spray bottle.

Method of Evaluating Phytotoxicity of the Herbicide and Level of Resistance of the Mutant Rice to the Herbicide The following method was used to evaluate phytotoxicity of the herbicide on the mutant rice plants when the herbicide is applied alone and when the herbicide is applied in combination with the safener.

Four days after treatment, the tops of the plants were cut off so that approximately 2.5 cm of plant from the top of the soil remain. The plants were allowed to regrow for 3 days at which time the amount of regrowth was weighed by measuring the amount of fresh weight of tissue that regrew. Comparing the weight of regrowth of shoots after cutting indicates the level of phytotoxicity the herbicide had on the mutant rice plant and the increased level of resistance of the mutant rice to the herbicide when the herbicide was applied in combination with the safener.

Method for Evaluating the Effect of Safener on the Level of Resistance of the Mutant Rice to the Herbicide The following method was used to evaluate the effect of the safener on the resistance of the mutant rice to the herbicide when the herbicide was applied alone and when the herbicide was applied in combination with the safener.

Four days after treatment, the tops of the plants were cut off so that approximately 5 of plant from the top of the soil remain. The plants were allowed to regrow for 3 days at which time the amount of regrowth was weighed by measuring the amount of fresh weight of tissue that regrew.

Results and Discussion:

Efficacy test were conducted to determine the effect of quizalofop and propaquizafop on the rice plant with the G2096S substitution (ML0831265-01493 (ATCC deposit PTA-12933, mutation G2096S) in the presence of different safeners.

The safeners were applied in various w/w ratios with the ACCase inhibiting herbicides to the rice plant. The results are shown in Table 1.

TABLE 1

Effect of tank mixes of safeners with propaquizafop or quizalofop on tolerance of the mutant rice where tolerance is evaluated by amount of regrowth calculated by weighing the amount of material that had regrown above the 2.5 cm level

| Safener | Rate of Safener (g/ha) | Regrowth* (fresh weight mg) Propaquizafop | Quizalofop |
|---|---|---|---|
| Untreated | | 570 a | 570 a |
| No safener | | 25 f | 70 d |
| Cloquinocet | 12.5 | 42 e | 172 cd |
| | 25 | 90 d | 132 d |
| | 50 | 158 c | 252 c |
| | 100 | 355 b | 398 b |
| Isoxadifen | 12.5 | 38 ef | 87 d |
| | 25 | 258 c | 285 c |
| | 50 | 310 b | 335 b |
| | 100 | 488 ab | 462 ab |
| AD-67 | 12.5 | 68 ef | 202 c |
| | 25 | 222 c | 292 b |
| | 50 | 288 cb | 348 b |
| | 100 | 512 a | 505 a |
| Fenclorim | 12.5 | 15 f | 42 d |
| | 25 | 13 f | 52 d |
| | 50 | 15 f | 67 d |
| | 100 | 15 f | 55 d |

*Values within a column followed by the same letter are not significantly different ($p = 0.05$)

The amount of plant regrowth observed for the ACCase resistant rice is compared to the amount of regrowth observed for the weedy rice. The weedy rice was killed by quizalofop ethyl at the rates tested, so there was no regrowth.

The safeners were also applied in various w/w ratios of the ACCase inhibiting herbicides to the rice seeds. The results are shown in Table 2.

TABLE 2

Effect of propaquizafop or quizalofop on tolerance of ACCase inhibitor resistant rice seeds (ML0831265-01493 (ATCC deposit PTA-12933, mutation G2096S)) treated with safener (as seed treatment) where tolerance is evaluated by amount of regrowth calculated by weighing the amount of material that had regrown above the 2.5 cm level

| Safener (g/kg of seed) | Rate of Safener | Regrowth* (fresh weight mg) Propaquizafop | Quizalofop |
|---|---|---|---|
| Untreated | | 457 a | 457 a |
| No safener | | 55 d | 107 d |
| Cloquinocet | 0.5 | 275 b | 143 c |
| | 1 | 342 b | 145 c |
| | 2 | 358 b | 273 b |
| Isoxadifen | 0.5 | 133 c | 165 c |
| | 1 | 170 c | 103 d |
| | 2 | 298 b | 80 d |
| AD-67 | 0.5 | 173 c | 233 b |
| | 1 | 113 c | 285 b |
| | 2 | 170 c | 298 b |
| Fenclorim | 0.5 | 137 c | 163 c |
| | 1 | 195 b | 167 c |
| | 2 | 283 b | 180 c |
| Benzacor | 0.5 | 37 d | 90 d |
| | 1 | 107 c | 72 d |
| | 2 | 98 c | 78 d |

*Values within a column followed by the same letter are not significantly different ($p = 0.05$)

FIG. 1 shows the effect of isoxadifen on the regrowth of the mutant rice after application of quizalofop.

Example 2: Effects of Safeners on Resistance of the Mutant Rice to the Herbicides under Growth Conditions with Low and High Light Intensity When grown under low light intensity (150 uM/m2/sec), 40 g/ha of quizalofop reduced growth of the mutant rice by 80%. The application of 100 g/ha of isoxadifen increased the resistance of the mutant rice to the quizalofop so that there is less than 20% reduction in growth.

Under high light intensity (800-1000 uM/m2/sec), the mutant rice is much more resistant to quizalofop. At 40 g/ha there is no inhibition of growth, but at 70 g/ha, there is over 80% reduction in growth. The application of isoxadifen reduced damaging effect of the quizalofop so that regrowth was not significant affected at any of the rates tested. The results are shown in Table 3.

TABLE 3

| Light Intensity | Safener | Herbicide Rate (g/ha) | Regrowth (mg FW) |
|---|---|---|---|
| Low | None | 0 | 437 a |
| | | 30 | 30 d |
| | | 40 | 0 d |
| | | 50 | 0 d |
| | | 60 | 0 d |
| | | 70 | 0 d |
| | With | 0 | 183 b |
| | | 30 | 117 c |
| | | 40 | 100 c |
| | | 50 | 150 c |
| | | 60 | 50 d |
| | | 70 | 30 d |
| High | None | 0 | 670 a |
| | | 30 | 447 a |
| | | 40 | 533 a |
| | | 50 | 220 b |
| | | 60 | 107 b |
| | | 70 | 76.7 b |
| | With | 0 | 540 a |
| | | 30 | 630 a |
| | | 40 | 533 a |
| | | 50 | 603 a |
| | | 60 | 427 a |
| | | 70 | 540 a |

*Values within a column followed by the same letter are not significantly different ($p = 0.05$)

Example 3: Efficacy Tests to Determine the Synergistic Effect of Herbicide Resistant Rice Crop (Mutant) and Safener Efficacy tests were conducted to determine the effect of quizalofop in the presence of isoxadifen (safener) on herbicide resistant rice crop (rice plants with the G2096S substitution (ML0831265-01493 (ATCC deposit PTA-12933, mutation G2096S) with a focus on synergistic effects.

Method for Evaluating the Synergistic Effect Between the Safener and Mutant to Herbicide The quizalofop (in rates of 0, 2, 6 18, 54 and 162 g/ha) was applied on wild type rice and herbicide resistance rice in the presence or absence of safener (isoxadifen at 100 g/ha).

Four days after treatment, the tops of the plants were cut off so that approximately 2.5 cm of plant from the top of the soil remain. The plants were allowed to regrow for 3 days at which time the amount of regrowth was weighed by measuring the amount of fresh weight of tissue that regrew.

The improvement in regrowth was calculated by subtracting the regrowth from a) wild type rice and wild type rice with isoxadifen; b) herbicide resistant rice; and c) herbicide resistant rice and isoxadifen.

Calculations were done for each application rate of quizalofop. The efficacy of safener alone and mutation alone on decreasing herbicide effect/increasing herbicide resistance were calculated. The relative fresh weight re-growth is the percentage of activity (for Colby).

The re-growth data was implemented in curve and the synergistic effect was calculated.

Synergy was calculated using the Colby equation:

$$E = X + Y - \frac{XY}{100}$$

in which E represents the percentage of regrowth expected for the application of safener on mutant rice crop at the defined doses of herbicide. X is the percentage of regrowth for the application of safener on wildtype rice crop at the defined doses of herbicide. Y is the percentage of regrowth for mutant rice crop at the defined doses of herbicide without safener application. When the percentage of regrowth observed for the application of safener on mutant rice crop at the defined doses of herbicide is greater than expected as calculated using the Colby equation, there is a synergistic effect.

Figure 2A:
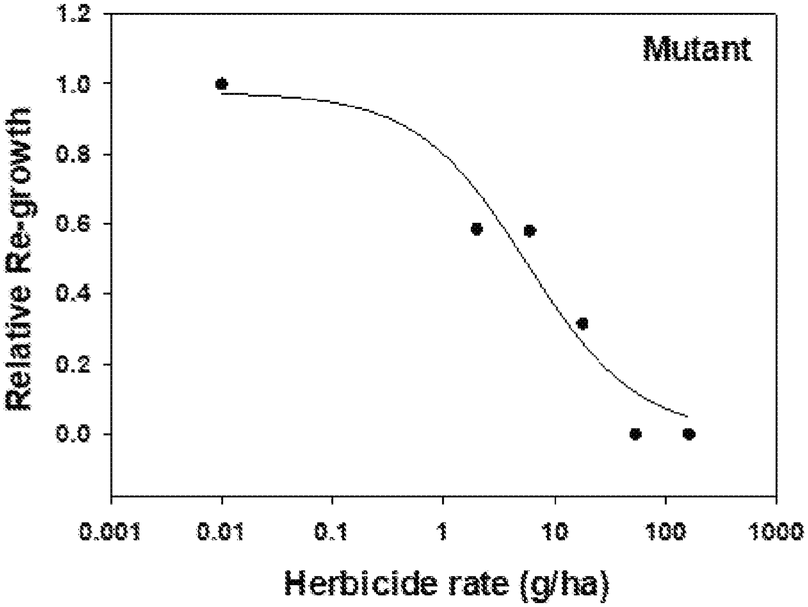
FIGS. 2A, 2B and 2C show the response curves for quizalofop on (A) wild type rice in presence of safener, (B) mutant type and (C) mutant type in the presence of safener.
Figure 2B:
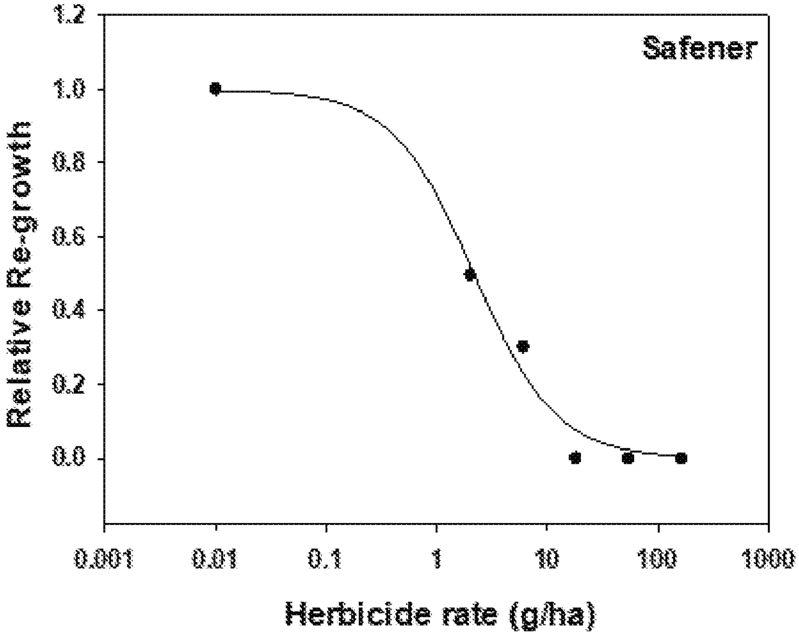
Figure 2C:
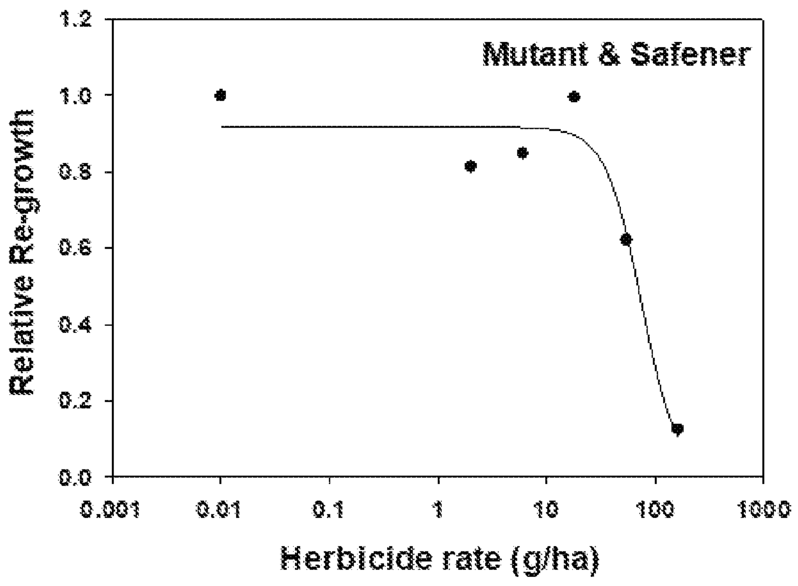

The calculations and results are shown in Table 4 and FIG. 2.

TABLE 4

Relative fresh re-growth and synergistic results

| | Rate g/ha | Non-Traited Rice | Safener & Non-Traited Rice | Calculated effect of Safener | Mutant | Mutant & Safener |
|---|---|---|---|---|---|---|
| | | Relative fresh weight re-growth after treatment | | | | |
| Control | 0 | 1.00 | 1.00 | 1.00 | 1.00 | 1.00 |
| Quizalofop | 2 | 0.54 | 1.04 | 0.50 | 0.59 | 0.81 |
| | 6 | 0.18 | 0.48 | 0.30 | 0.58 | 0.85 |
| | 18 | 0.00 | 0.00 | 0.00 | 0.32 | 1.00 |
| | 54 | 0.00 | 0.00 | 0.00 | 0.00 | 0.62 |
| | 162 | 0.00 | 0.00 | 0.00 | 0.00 | 0.13 |
| ED50 (g/ha) | | 2.20 | 6.0 | | 5.2 | 69 |
| Efficacy at ED50 of mutant- 5.2 g/ha (%) | | | | 26 | 50 | |
| Calculated efficacy base on Colby (%) | | | | 63 | | |
| Observed efficacy (%) | | | | | | 92 |

The results presented in FIG. 2 may also be summarized as follows:

$$\text{Efficacy} = \frac{a}{1 + \exp\left(\frac{C}{Co}\right)^{b}}$$

TABLE 5

Response curve fitting

| | | Safener | Mutant | Mutant & Safener |
|---|---|---|---|---|
| Response curve fitting parameters | a | 1 | 0.97 | 0.92 |
| | b | 1.18 | 0.87 | 2.63 |
| | $C_0$ | 2.18 | 5.7 | 74.7 |

The percentage of regrowth observed for the application of safener on mutant rice crop at the defined doses of herbicide was greater than the expected percentage of regrowth calculated using the Colby equation. This result indicates synergy.

An additional way to demonstrate the synergistic effect is the ability of increasing the ED50 (FIG. 2). ED50 when the herbicide is applied to wildtype rice crop, without safener application, is 2.2 g/ha. In the presence of safener, ED50 is increased to 6.0 g/ha. The safener increases resistance by 2.7 folds. ED50 when the herbicide is applied to mutant rice, without safener application, is 5.2 g/ha. The mutation provides a 2.4-fold increase in tolerance to herbicide.

The additive effect of safener and mutation should be a 5.1-fold increase (2.7+2.4=5.1) in ED50 compared to wildtype rice without safener. The Observed ED50 for the herbicide resistant rice in the presence of safener increased to 69 g/ha, which is a 31.4-fold increase compared to wildtype rice without safener. This result shows an unexpected effect of synergism.

In some embodiments, efficacy is measured by regrowth of the treated crop.

Example 4: Effects of ALS herbicide and Safeners on Mutant Rice

Mutant Rice

The rice cultivar contains mutation(s) in the ALS gene which makes the enzyme insensitive to imazamox.

Growing Conditions, Materials and Methods

Seed of an ALS resistant rice variety (rice plant with the A205V and G654E substitution (ATCC accession numbers PTA-123859, PTA-123860 and/or PTA-123861) is planted in a commercial greenhouse soil mix in 10×10×10 cm plastic pots. 250 mL of soil is put into each pot, then the seed is placed on top of the soil and the seed is covered with 100-150 mL of soil. Approximately 8-10 seeds are planted per pot. The pots are then watered with 100 mL of a mixture of Miracle Grow and Fertiplus (iron supplement). The pots are placed in the greenhouse (38° C./20° C. day/night, 14 h photoperiod with supplemental light). The average light intensity in the greenhouse is 150 $\mu M/m^2/sec$.

Plants are grown until 10 days after planting and then the pots are transferred to trays and the plants are grown under water. Plants are treated when they reach the 3-5 leaf stage.

Herbicide Application

Generally, plants are treated through a moving nozzle spray system in a spray volume of 200 l/ha or 187 l/ha. Isoxadifen is tank mixed with the herbicide in the spray bottle at a rate of 100 g/ha.

Measurement of Herbicidal Effects

Four days after treatment, the tops of the plants are cut off to approximately 3 cm from the top of the soil. The plants are allowed to regrow for 7 days at which time the amount of regrowth is measured by cutting any growth above 3 cm above the top of soil and weighing the tissue that regrew.

Efficacy tests were conducted to determine the effect of imazamox on rice plant with the A205V and G654E substitutions (ATCC accession numbers PTA-123859, PTA-123860 and/or PTA-123861) in the presence of safener (isoxadifen).

The imazamox (in rates of 0, 2.2, 6.6, 19.7, 54.9 and 177.3 g/ha) was applied on wild type rice and herbicide resistance rice in the presence or absence of safener (isoxadifen at 100 g/ha).

The improvement in regrowth was calculated by subtracting the regrowth from a) wild type rice and wild type rice with isoxadifen; b) herbicide resistant rice; and c) herbicide resistant rice and isoxadifen.

Calculations were done for each application rate of imazamox. The efficacy of safener alone and mutation alone on decreasing herbicide effect/increasing herbicide resistance were calculated. The relative fresh weight re-growth is the percentage of activity (for Colby).

The re-growth data was implemented in curve and the synergistic effect was calculated. The observed efficacy is higher than calculated efficacy.

Figure 3A:
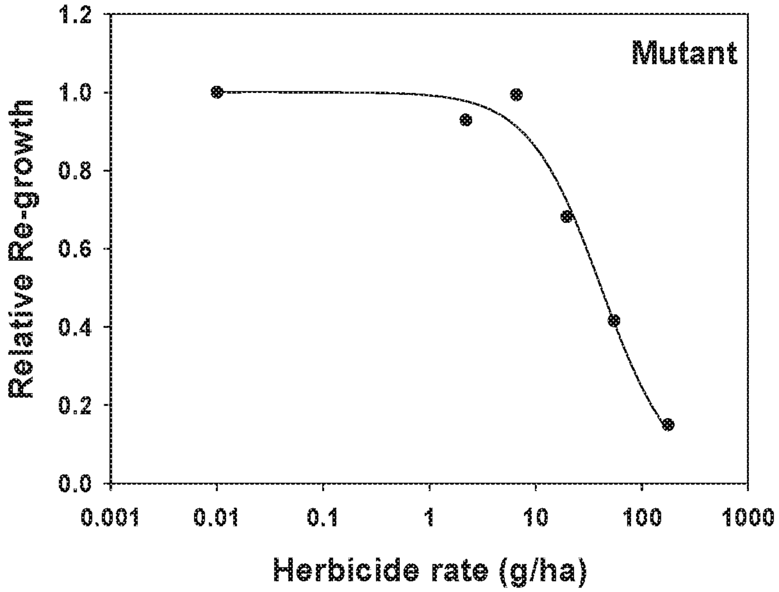
FIGS. 3A, 3B and 3C show the response curves for imazamox on (A) wild type rice in the presence of safener, (B) mutant type and (C) mutant type in the presence of safener.
Figure 3B:
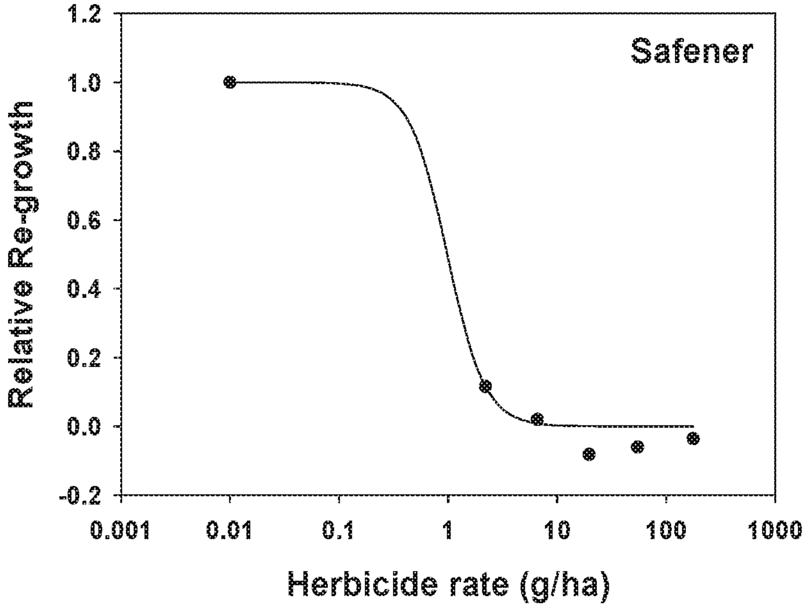
Figure 3C:
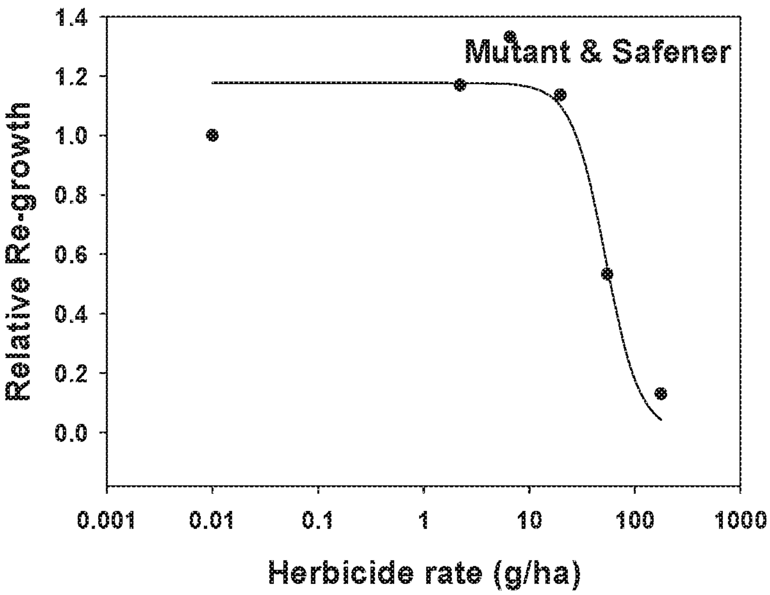

The calculations and results are shown in Table 6 and FIG. 3.

TABLE 6

Relative fresh re-growth and synergistic results

| | Rate g/ha | Non-Traited Rice | Safener & Non-Traited Rice | Calculated effect of Safener | Mutant | Mutant & Safener |
|---|---|---|---|---|---|---|
| | | Relative fresh weight re-growth after treatment | | | | |
| control | 0.01 | 1.00 | 1.00 | 1.00 | 1.00 | 1.00 |
| Imazamox | 2.2 | 0.36 | 0.47 | 0.12 | 0.93 | 1.17 |
| | 6.6 | 0.16 | 0.17 | 0.02 | 0.99 | 1.33 |
| | 19.7 | 0.14 | 0.06 | −0.08 | 0.68 | 1.14 |
| | 54.9 | 0.11 | 0.05 | −0.06 | 0.42 | 0.53 |
| | 177.3 | 0.09 | 0.05 | −0.04 | 0.15 | 0.13 |
| ED50 (g/ha) | | 0.49 | 1.95 | | 42 | 59 |
| Efficacy at ED50 of mutant- 42 g/ha (%) | | | | 0 | 50 | |
| Calculated efficacy base on Colby (%) | | | | 50 | | |
| Observed efficacy (%) | | | | | | 77 |

The results presented in FIG. 3 may be summarized as follows:

$$\text{Efficacy} = \frac{a}{1 + \exp\left(\frac{C}{Co}\right)^{b}}$$

TABLE 7

Response curve fitting

| | | Safener | Mutant | Mutant & Safener |
|---|---|---|---|---|
| Response curve fitting parameters | a | 1.0 | 1.0 | 1.2 |
| | b | 2.5 | 1.3 | 2.7 |
| | $C_0$ | 0.98 | 41 | 53 |

The percentage of regrowth observed for the application of safener on mutant rice crop at the defined doses of herbicide was greater than the expected percentage of regrowth calculated using the Colby equation. This result indicates synergy.

An additional way to demonstrate the synergistic effect is the ability of increasing the ED50 (FIG. 3). ED50 when the herbicide is applied to wildtype rice crop, without safener application, is 0.49 g/ha. In the presence of safener, ED50 is increased to 1.95 g/ha. The safener increases resistance by 4 folds. ED50 when the herbicide is applied to mutant rice, without safener application, is 42 g/ha. The mutation provides an 85-fold increase in tolerance to herbicide.

The additive effect of safener and mutant should be 4+85=89 folds of the ED50.

The observed ED50 for the herbicide resistant rice in the presence of safener, increased to 59 g/ha, 120 folds the wildtype. This result shows an unexpected effect of synergism.

Example 5: Effects of Mesotrione, Tembotrione, Isoxaflutole and Safeness on Mutant Rice Mutant Rice The rice cultivar contains mutation(s) in the HPPD gene which makes the enzyme insensitive to mesotrione and/or tembotrione and/or isoxaflutole.

The mutant rice may be any mutant rice line resistant to HPPD inhibiting herbicide(s).

Growing Conditions, Materials and Methods

Seed of HPPD resistant rice variety is planted in a commercial greenhouse soil mix in 10×10×10 cm plastic pots. 250 mL of soil is put into each pot, then the seed is placed on top of the soil and the seed is covered with 100-150 mL of soil. Approximately 8-10 seeds are planted per pot. The pots are then watered with 100 mL of a mixture of Miracle Grow and Fertiplus (iron supplement). The pots are placed in the greenhouse (38° C./20° C. day/night, 14 h photoperiod with supplemental light). The average light intensity in the greenhouse was 150 $\mu M/m^2/sec$.

Plants are grown until 10 days after planting and then the pots are transferred to trays and plants are grown under water. Plants are treated when they reach the 3-5 leaf stage.

Herbicide Application

Generally, plants are treated with 50-250 g/ha of mesotrione or tembotrione or isoxaflutole through a moving nozzle spray system in a spray volume of 200 l/ha or 187 l/ha. Isoxadifen is tank mixed with the herbicide in the spray bottle. The weight ratio of the safener to the herbicide in the tank mix is from 1:1 to 1:5.

Measurement of Herbicidal Effects

Four days after treatment, the tops of the plants are cut off to approximately 3 cm from the top of the soil. The plants are allowed to regrow for 7 days at which time the amount of regrowth is measured by cutting any growth above 3 cm above the top of soil and weighing the tissue that regrew.

Efficacy test is conducted to determine the effect of mesotrione on mutant rice in the presence of isoxadifen.

The weight the regrown shoot on mutant rice applied with mesotrione is compared with the weight of regrown shoot on mutant rice applied with mesotrione and isoxadifen at various rates.

Results show that application of isoxadifen significantly reduces the phytotoxicity of mesotrione on the mutant rice compared to the same mutant rice not treated with isoxadifen.

Results also show that application of isoxadifen significantly increases the level of resistance of the mutant rice to mesotrione compared to the same mutant rice not treated with isoxadifen.

Efficacy test is conducted to determine the effect of tembotrione on mutant rice in the presence of isoxadifen.

The weight the regrown shoot on mutant rice applied with tembotrione is compared with the weight of regrown shoot on mutant rice applied with tembotrione and isoxadifen at various rates.

Results show that application of isoxadifen significantly reduces the phytotoxicity of tembotrione on the mutant rice compared to the same mutant rice not treated with isoxadifen.

Results also show that application of isoxadifen significantly increases the level of resistance of the mutant rice to tembotrione compared to the same mutant rice not treated with isoxadifen.

Efficacy test is conducted to determine the effect of isoxaflutole on mutant rice in the presence of isoxadifen.

The weight the regrown shoot on mutant rice applied with isoxaflutole is compared with the weight of regrown shoot on mutant rice applied with isoxaflutole and isoxadifen at various rates.

Results show that application of isoxadifen significantly reduces the phytotoxicity of isoxaflutole on the mutant rice compared to the same mutant rice not treated with isoxadifen.

Results also show that application of isoxadifen significantly increases the level of resistance of the mutant rice to isoxaflutole compared to the same mutant rice not treated with isoxadifen.

What is claimed is:

1. A method of controlling undesired vegetation at a locus of an herbicide resistant rice crop and reducing phytotoxic action of an acetyl Co-A carboxylase (ACCase) inhibiting herbicide on the herbicide resistant rice crop comprising applying a) the ACCase inhibiting herbicide, and b) at least one herbicide safener selected from the group consisting of isoxadifen, cloquintocet, and esters, salts and combinations thereof to the locus of the herbicide resistant rice crop so as to effectively control the undesired vegetation at the locus of the herbicide resistant rice crop and reduce phytotoxic action of the ACCase inhibiting herbicide on the herbicide resistant rice crop compared to the phytotoxic action of the ACCase inhibiting herbicide when applied to the herbicide resistant rice crop without the safener, wherein the herbicide resistant rice crop has at least one genetic mutation that confers the rice crop resistance to the ACCase inhibiting herbicide applied, and wherein (i) (a) the herbicide is applied at a rate from 1 g/ha to 200 g/ha, and (b) the safener is applied a rate from 1 g/ha to 200 g/ha, or (ii) (a) the herbicide is applied at a rate from 1 g/ha to 200 g/ha, and (b) the safener is applied to seeds of the herbicide resistant rice crop at a rate from 0.5 g to 2 g of safener per kg of seeds.

2. The method of claim 1, wherein:

a) the ACCase inhibiting herbicide is propaquizafop or quizalofop, and/or b) the safener is isoxadifen.

3. The method of claim 1, wherein the herbicide and the safener are applied simultaneously.

4. The method of claim 1, wherein the undesired vegetation is red rice.

5. The method of claim 1, wherein the method comprises applying the ACCase inhibiting herbicide quizalofop and the safener isoxadifen.

6. The method of claim 1, wherein the weight ratio of the herbicide to the safener in the herbicidal mixture is from 1:4 to 5:1.

7. The method of claim 1, wherein the safener is effective in reducing the phytotoxic action of the ACCase inhibiting herbicide on the herbicide resistant rice crop grown under low light intensity conditions or high light intensity conditions.

8. The method of claim 1, wherein the safener is effective for reducing herbicide effect of the ACCase inhibiting herbicide in the herbicide resistant rice crop compared to the herbicide effect in the same herbicide resistant rice crop to which the safener was not applied.

9. The method of claim 1, wherein the herbicide and the safener are applied in a tank mix.

10. The method of claim 1, wherein:

a) the ACCase inhibiting herbicide is quizalofop or propaquizafop, and/or b) the safener is cloquintocet-mexyl.

11. The method of claim 1, wherein the undesired vegetation is monocot.

12. The method of claim 1, wherein the safener is applied a rate from 25 g/ha to 150 g/ha.

13. The method of claim 1, wherein the safener is applied a rate from 50 g/ha to 150 g/ha.

14. The method of claim 1, wherein the weight ratio of the herbicide to the safener is from 1:4 to 10:1.

15. The method of claim 1, wherein the ACCase inhibiting herbicide is an aryloxyphenoxypropionate.

16. The method of claim 1, wherein the ACCase inhibiting herbicide and the safener are applied one to three times during the growing season and wherein the herbicide is applied each time at a rate from 1 g/ha to 200 g/ha and the safener is applied each time at a rate from 1 g/ha to 200 g/ha.

17. The method of claim 1, wherein the ACCase inhibiting herbicide and the safener are applied two times during the growing season and wherein the herbicide is applied each time at a rate from 1 g/ha to 200 g/ha and the safener is applied each time at a rate from 1 g/ha to 200 g/ha.

18. A method of (i) reducing phytotoxic action of an ACCase inhibiting herbicide applied to a rice crop resistant to the ACCase inhibiting herbicide, (ii) increasing resistance of an ACCase inhibiting herbicide resistant rice crop to an ACCase inhibiting herbicide, or (iii) reducing herbicide effects of an ACCase inhibiting herbicides in an ACCase inhibiting herbicide resistant rice crop, comprising:

(i) applying an effective amount of at least one safener selected from the group consisting of isoxadifen, cloquintocet, and esters, salts and combinations thereof to the ACCase inhibiting herbicide resistant rice crop, wherein the rice crop has at least one genetic mutation that confers the rice crop resistance to the ACCase inhibiting herbicide applied, and wherein the safener is effective for reducing the phytotoxic action of the ACCase inhibiting herbicide on the herbicide resistant rice crop as compared to the same rice crop to which the safener was not applied, (ii) applying at least one safener selected from the group consisting of cloquintocet, isoxadifen, and esters, salts and combinations thereof to the rice crop, wherein the rice crop has at least one genetic mutation that confers the rice crop resistance to the ACCase inhibiting herbicide applied, and wherein the safener is effective for increasing resistance of the rice crop to the ACCase inhibiting herbicide as compared to the same rice crop to which the safener was not applied, or (iii) applying at least one safener selected from the group consisting of isoxadifen, cloquintocet, and esters, salts and combinations thereof to a plant and/or seed of the rice crop, wherein the rice crop has at least one genetic mutation that confers the rice crop resistance to the ACCase inhibiting herbicide applied, and wherein the safener is effective for reducing herbicide effects in the rice crop as compared to the herbicide effects in the same rice crop to which the safener was not applied, wherein (i) (a) the herbicide is applied at a rate from 1 g/ha to 200 g/ha, and (b) the safener is applied a rate from 1 g/ha to 200 g/ha, or (ii) (a) the herbicide is applied at a rate from 1 g/ha to 200 g/ha, and (b) the safener is applied to seeds of the herbicide resistant rice crop at a rate from 0.5 g to 2 g of safener per kg of seeds.

* * * * *